US012530258B2

(12) United States Patent
Kim

(10) Patent No.: US 12,530,258 B2
(45) Date of Patent: Jan. 20, 2026

(54) MEMORY DEVICE PERFORMING LINK ECC OPERATION AND OPERATING METHOD THEREOF

(71) Applicant: SK hynix Inc., Gyeonggi-do (KR)

(72) Inventor: Hyun Seung Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/884,113

(22) Filed: Sep. 13, 2024

(65) Prior Publication Data

US 2025/0355765 A1 Nov. 20, 2025

(30) Foreign Application Priority Data

May 17, 2024 (KR) .......................... 10-2024-0064465

(51) Int. Cl.
*G06F 11/10* (2006.01)
*G06F 3/06* (2006.01)

(52) U.S. Cl.
CPC ........ *G06F 11/1044* (2013.01); *G06F 3/0611* (2013.01); *G06F 3/0659* (2013.01); *G06F 3/0673* (2013.01)

(58) Field of Classification Search
CPC ............... G06F 11/1044; G06F 3/0611; G06F 11/0659; G06F 3/0673
See application file for complete search history.

(56) References Cited

U.S. PATENT DOCUMENTS

| | | | |
|---|---|---|---|
| 2006/0010339 A1* | 1/2006 | Klein ................... | G06F 11/1052 714/E11.05 |
| 2019/0250985 A1* | 8/2019 | Seo ...................... | G06F 11/1068 |
| 2020/0192476 A1 | 6/2020 | Bade et al. | |
| 2021/0406123 A1* | 12/2021 | Nakanishi ............... | G11C 7/22 |
| 2022/0382464 A1* | 12/2022 | Kim ...................... | G06F 3/0679 |

FOREIGN PATENT DOCUMENTS

KR 10-2018-0117041 A 10/2018

OTHER PUBLICATIONS

Extended European Search Report for European Patent Application No. 24221043.3 issued by the European Patent Office on Jun. 25, 2025.

* cited by examiner

*Primary Examiner* — Bryce P Bonzo
*Assistant Examiner* — Audrey Emma Whitesell
(74) *Attorney, Agent, or Firm* — IP & T GROUP LLP

(57) ABSTRACT

A memory device includes a syndrome calculator configured to generate an error location signal based on first data and an error correction code; an error corrector configured to generate second data by correcting an error in the first data according to the error location signal; and a data mask (DM) calculation circuit configured to generate a DM signal according to logic high bits of the first data and change a logic level of the DM signal according to at least one of an increase signal and a decrease signal, by activating the increase signal when an error bit is detected in logic low bits of the first data and activating the decrease signal when the error bit is detected in the logic high bits of the first data, based on the error location signal.

22 Claims, 18 Drawing Sheets

FIG. 8

| DM_BL LOGIC LEVEL | | S1A | S2A | S3A |
|---|---|---|---|---|
| | | 0 | 1 | 2 | 3 |
| | 0 | 0 | 0 | 0 | 0 |
| S1B | 1 | 0 | 0 | 0 | 0 |
| S2B | 2 | 0 | 0 | 0 | 1 |
| S3B | 3 | 0 | 0 | 1 | 1 |

MEMORY DEVICE PERFORMING LINK ECC OPERATION AND OPERATING METHOD THEREOF

CROSS-REFERENCE TO RELATED APPLICATION

The present application claims the benefit of Korean Patent Application No. 10-2024-0064465, filed on May 17, 2024, which is incorporated herein by reference in its entirety.

BACKGROUND

1. Field

Various embodiments of the present disclosure relate to a semiconductor design technology, and more particularly, to a memory system including a memory device supporting a link error correction code (ECC) operation, a data masking (DM) operation, and a data bus inversion (DBI) operation.

2. Description of the Related Art

In the early stages of the semiconductor memory industry, memory chips were produced with no defective memory cells through a semiconductor fabrication process. However, as the capacity of memory devices increases, it becomes difficult to fabricate a memory device having no defective memory cell. Currently, there is substantially no chance that a memory device can be fabricated without any defective memory cells. To address this issue, a repair method of replacing defective memory cells with redundant memory cells, or an error correcting method for correcting errors in a memory device using an on-chip error correction circuit is being used.

Since the communication speed of a channel between a memory controller and a memory device is increasing, interest in the transmission accuracy of signals is increasing. Accordingly, a method of correcting errors that may occur in channel transmission has been proposed by adopting a link error correction circuit in the memory controller and the memory device at both ends of the channel, delivering data together with an error correction code at a data transmission terminal, and correcting errors in the received data using the received error correction code at a data reception terminal.

SUMMARY

Embodiments of the present disclosure are directed to a memory device supporting a link error correction code (ECC) operation, a data masking (DM) operation, and a data bus inversion (DBI) operation, and an operating method thereof.

According to an embodiment of the present disclosure, a memory device includes a syndrome calculator configured to generate an error location signal based on first data and an error correction code; an error corrector configured to generate second data by correcting an error in the first data according to the error location signal; and a data mask (DM) calculation circuit configured to generate a DM signal according to logic high bits of the first data and change a logic level of the DM signal according to at least one of an increase signal and a decrease signal, by activating the increase signal when an error bit is detected in logic low bits of the first data and activating the decrease signal when the error bit is detected in the logic high bits of the first data, based on the error location signal.

According to an embodiment of the present disclosure, a memory device includes a syndrome calculator configured to generate first and second error location signals based on first data and an error correction code, the first data including m burst data input through data pads during m burst lengths, where m is a positive integer; an error corrector configured to generate second data by correcting an error in the first data according to the first and second error location signals; and a plurality of data mask (DM) calculators configured to generate DM signals corresponding to the m burst data, each DM calculator configured to generate an increase signal and a decrease signal by detecting whether an error occurs in corresponding burst data according to the first and second error location signals, and generate a corresponding DM signal according to at least one of the increase signal and the decrease signal.

According to an embodiment of the present disclosure, an operating method of a memory device includes generating an error location signal based on first data and an error correction code; generating second data by correcting an error in the first data according to the error location signal; generating a data mask (DM) signal according to logic high bits of the first data and changing a logic level of the DM signal according to at least one of an increase signal and a decrease signal, by activating the increase signal when an error bit is detected in logic low bits of the first data and activating the decrease signal when the error bit is detected in the logic high bits of the first data, based on the error location signal; and writing the second data to a memory core by selectively masking the second data according to the DM signal.

According to an embodiment of the present disclosure, a memory device may minimize a write latency by performing an error correction operation and a DM calculation operation in parallel during a link ECC operation.

BRIEF DESCRIPTION OF THE DRAWINGS

FIG. 8 is a table for explaining an operation of the DM calculator of FIG. 7.

DETAILED DESCRIPTION

Figure 1:
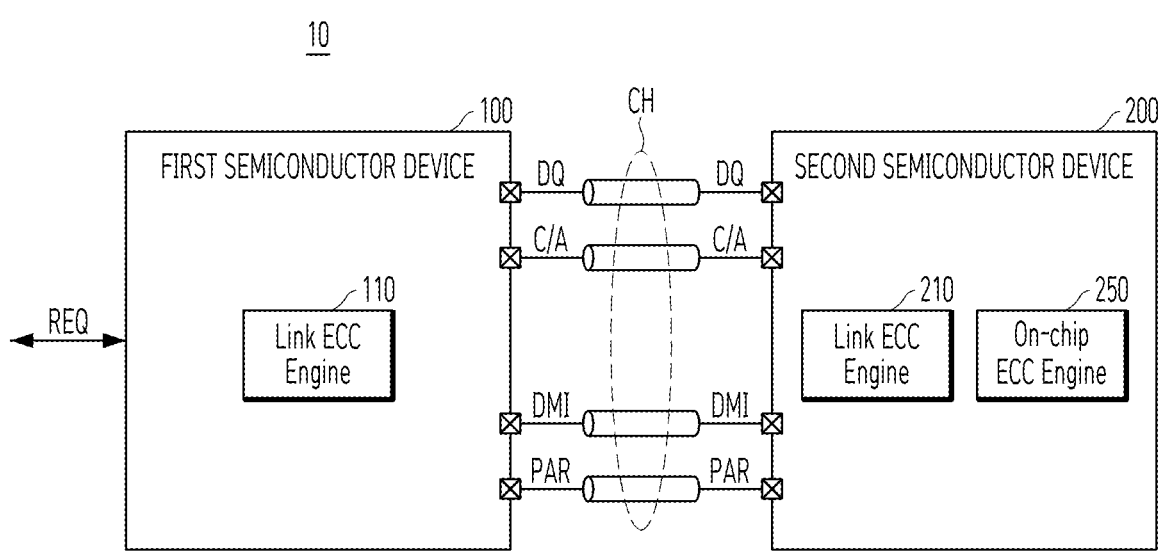
FIG. 1 is a block diagram illustrating a memory system according to an embodiment of the present disclosure.

Various embodiments of the present disclosure will be described below in more detail with reference to the accompanying drawings. The embodiments of the present disclosure may, however, be in different forms and should not be construed as limited to the embodiments set forth herein. Rather, these embodiments are provided so that this disclosure will be thorough and complete, and will fully convey the scope of the present disclosure to those skilled in the art. Throughout this disclosure, like reference numerals refer to like parts throughout the various figures and embodiments of the present disclosure.

It will be understood that when an element is referred to as being "coupled" or "connected" to another element, it may mean that the two are directly coupled or the two are electrically connected to each other with another circuit intervening therebetween. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof. In the present disclosure, the singular forms are intended to include the plural forms as well, unless the context clearly indicates otherwise.

FIG. 1 is a block diagram illustrating a memory system 10 according to an embodiment of the present disclosure.

Referring to FIG. 1, the memory system 10 may store data or read stored data in response to a request REQ provided from a host. The memory system 10 may be used as a main memory device or an auxiliary memory device of the host. The memory system 10 may be used as a device that stores data under the control of the host such as a mobile phone, a smart phone, an MP3 player, a laptop computer, a desktop computer, a game player, a TV, a tablet PC, an in-vehicle infotainment system, and so forth.

The memory system 10 may include a first semiconductor device 100 and a second semiconductor device 200 as electronic components that communicate with each other. The first semiconductor device 100 may be a master device, and the second semiconductor device 200 may be a slave device that operates under control by the first semiconductor device 100.

The first semiconductor device 100 may be a host device such as a processor or a controller, and may include a central processing unit (CPU), a graphic processing unit (GPU), a multimedia processor (MMP), a digital signal processor, and a memory controller. In addition, the first semiconductor device 100 may be implemented in the form of a system on chip (SoC) by combining processor chips having various functions, such as an application processor (AP).

The second semiconductor device 200 may be a memory device and may include a volatile memory and/or a non-volatile memory. The volatile memory may include static RAM (SRAM), dynamic RAM (DRAM), synchronous DRAM (SDRAM), low power double data rate (LPDDR) DRAM. The non-volatile memory may include read only memory (ROM), programmable ROM (PROM), electrically erasable and programmable ROM (EEPROM), electrically programmable ROM (EPROM), flash memory, phase change RAM (PRAM), magnetoresistive RAM (MRAM), resistive RAM (RRAM), and ferroelectric RAM (FRAM).

The first semiconductor device 100 may control the overall operation of the second semiconductor device 200 and control a data exchange between the host and the second semiconductor device 200. The first semiconductor device 100 may transmit a command and address (command/address) signal C/A to the second semiconductor device 200 through a channel CH, and transmit and receive data DQ to and from the second semiconductor device 200 through the channel CH. For example, the first semiconductor device 100 may provide, to the second semiconductor device 200, the command/address signal C/A indicating a read operation according to the request REQ of the host. The first semiconductor device 100 may provide, to the second semiconductor device 200, the data DQ together with the command/address signal C/A indicating a write operation according to the request REQ of the host. The first semiconductor device 100 may receive the data DQ read from the second semiconductor device 200 and provide the data DQ read to the host. Although, in FIG. 1, the command/address signals C/A and the data DQ are shown as signals transmitted through one pad and one line, the command/address signals C/A and the data DQ can be composed of signals transmitted through a plurality of pads and lines, respectively.

The first semiconductor device 100 may include a link ECC engine 110. During a write operation, the first semiconductor device 100 may generate an error correction code PAR using the data DQ, and provide the error correction code PAR together with the data DQ to the second semiconductor device 200. During a read operation, the first semiconductor device 100 may receive the error correction code PAR together with the data DQ, and correct an error of the data DQ by using the error correction code PAR. Although not shown in FIG. 1, the first semiconductor device 100 may further include an additional system ECC engine in addition to the link ECC engine 110.

The second semiconductor device 200 may include a link ECC engine 210 and an on-chip ECC engine 250. During the write operation, the link ECC engine 210 may receive the error correction code PAR together with the data DQ from the first semiconductor device 100, correct an error in the data DQ using the error correction code PAR, and provide error-corrected data to the on-chip ECC engine 250. During the write operation, the on-chip ECC engine 250 may generate an internal error correction code using the error-corrected data, and store the error-corrected data and the internal error correction code in a memory region (hereinafter, referred to as a memory core). During the read operation, the on-chip ECC engine 250 may receive data and an internal error correction code from the memory core, and generate error-corrected data by correcting an error in the data using the internal error correction code. During the read operation, the link ECC engine 210 may generate the error correction code PAR using the error-corrected data transmitted from the on-chip ECC engine 250, and output the data DQ (i.e., the error-corrected data) and the error correction code PAR to the first semiconductor device 100.

As described above, the first semiconductor device 100 and the second semiconductor device 200 may perform a link ECC operation of first correcting a temporary error on the channel for transmitting and receiving the data DQ therebetween, by transmitting and receiving the error correction code PAR together with the data DQ through the channel CH. In this way, the transmission accuracy of the data on the communication link (i.e., the channel CH) between the first semiconductor device 100 and the second semiconductor device 200 may be guaranteed.

The first semiconductor device 100 and the second semiconductor device 200 may transmit and receive an information signal DMI through the channel CH. During the write operation, the first semiconductor device 100 may provide the information signal DMI to instruct a data bus inversion (DBI) operation and/or a data masking (DM) operation on the data DQ. When the information signal DMI is set to a first logic level (e.g., a logic high level), the second semiconductor device 200 may perform the DBI operation of inverting bits of the data DQ. In addition, the second semiconductor device 200 may generate a data masking (DM) signal for determining whether to perform the DM operation by counting the number of logic high bits of the data DQ. According to an embodiment, the second semiconductor device 200 may generate the DM signal only when the information signal DMI is a second logic level (e.g., a logic low level).

In conventional art, the second semiconductor device 200 may generate the DM signal by counting the number of logic high bits of error-corrected data according to the information signal DMI, after performing the link ECC operation during the write operation. Herein and below, the term "logic high bits" means bits having a logic high level, and the term "logic low bits" means bits having a logic low level. Accordingly, the write latency due to sequentially (or in serial) performing an error correction operation and a DM calculation operation has been lengthened.

Hereinafter, in accordance with an embodiment of the present disclosure, a method of reducing the write latency by simultaneously (or in parallel) performing an error correction operation and a DM calculation operation will be discussed.

Hereinafter, a detailed configuration of the second semiconductor device 200 according to an embodiment of the present disclosure will be described with reference to the drawings. Hereinafter, a case where the second semiconductor device 200 is a memory device will be described as an example. In the present disclosure, a description of a command/address signal input to the memory device 200 will be omitted.

Figure 2:
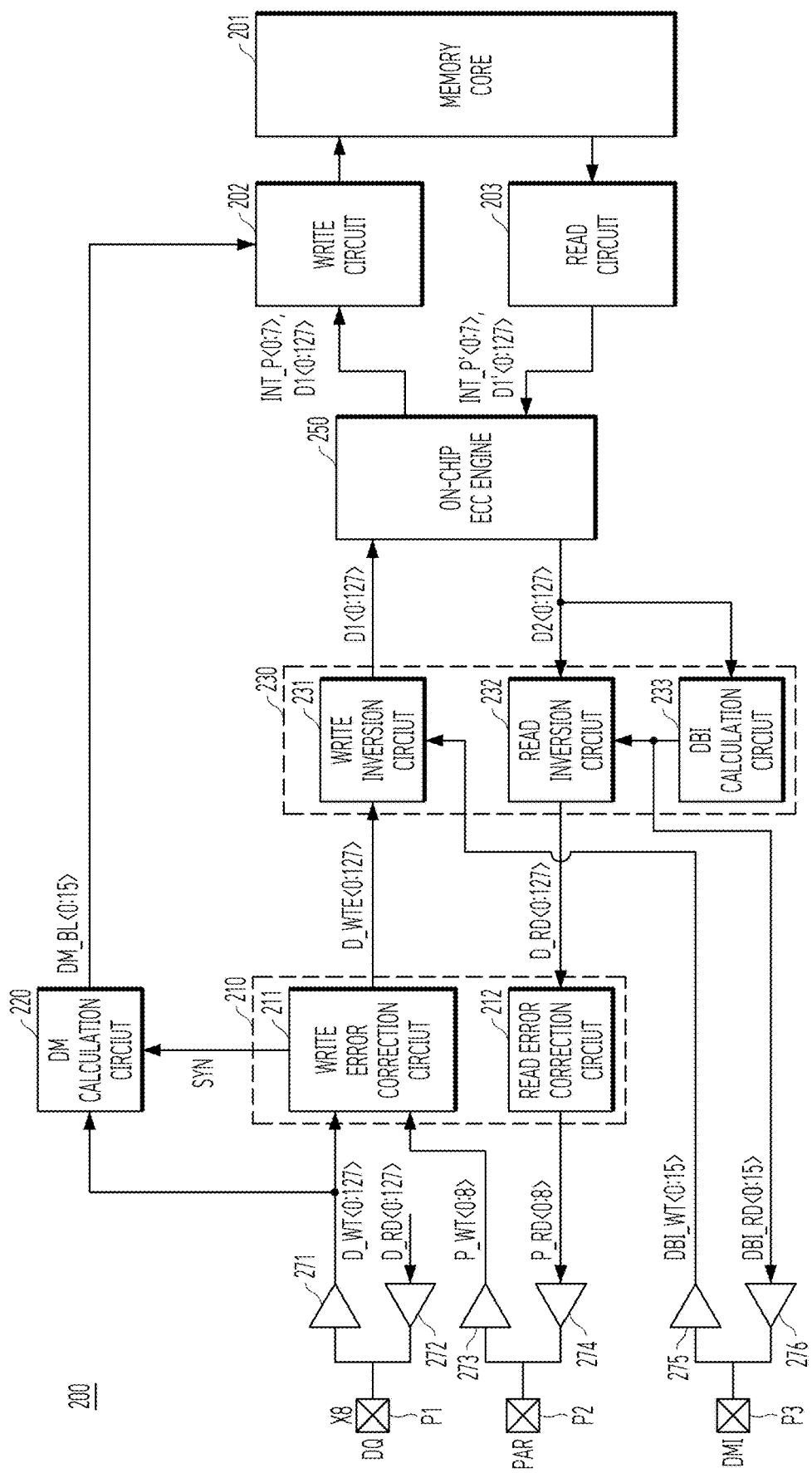
FIG. 2 is a detailed configuration diagram illustrating a memory device according to an embodiment of the present disclosure.

FIG. 2 is a detailed configuration diagram illustrating a memory device 200 according to an embodiment of the present disclosure.

Referring to FIG. 2, the memory device 200 may include a memory core 201, a write circuit 202, a read circuit 203, a link ECC engine 210, a DM calculation circuit 220, a DBI control circuit 230, an on-chip ECC engine 250, first to third input circuits 271, 273, and 275, and first to third output circuits 272, 274, and 276.

The first input circuit 271 may receive data DQ input through data pads P1 as write data D_WT<0:127>. The first output circuit 272 may output read data D_RD<0:127> transmitted from the DBI control circuit 230 as the data DQ through the data pads P1. The first input circuit 271 may parallelize the data DQ into the write data D_WT<0:127>. The first output circuit 272 may serialize the read data D_RD<0:127> into the data DQ. The first input circuit 271 may include a plurality of receivers corresponding to the data pads P1, respectively. The first output circuit 272 may include a plurality of transmitters corresponding to the data pads P1, respectively.

The second input circuit 273 may receive an error correction code PAR input through a parity pad P2 as a write error correction code P_WT<0:8>. The second output circuit 274 may output a read error correction code P_RD<0:8> transmitted from the link ECC engine 210 as the error correction code PAR through the parity pad P2.

The third input circuit 275 may receive a write DBI signal DBI_WT<0:15> from an information pad P3. The third output circuit 276 may output a read DBI signal DBI_RD<0:15> from the DBI control circuit 230 as the information signal DMI through the information pad P3.

The link ECC engine 210 may include a write error correction circuit 211 and a read error correction circuit 212. During a write operation, the write error correction circuit 211 may generate a syndrome SYN based on the write data D_WT<0:127> and the write error correction code P_WT<0:8>. The syndrome SYN may include information on a bit in which an error is located among 128 bits of the write data D_WT<0:127>. In addition, the write error correction circuit 211 may correct an error in the write data D_WT<0:127> according to the syndrome SYN to generate error-corrected data D_WTE<0:127>. During a read operation, the read error correction circuit 212 may generate the read error correction code P_RD<0:8> using the read data D_RD<0:127> transmitted from the DBI control circuit 230.

The DM calculation circuit 220 may generate data masking (DM) signals DM_BL<0:15> based on the write data D_WT<0:127> and the syndrome SYN. The DM calculation circuit 220 may generate the DM signals DM_BL<0:15> by counting the number of logic high bits of the write data D_WT<0:127>, while changing the DM signals DM_BL<0:15> according to the syndrome SYN.

The DBI control circuit 230 may include a write inversion circuit 231, a read inversion circuit 232, and a DBI calculation circuit 233. During the write operation, the write inversion circuit 231 may generate the write data D1<0:127> by selectively inverting bits of the error-corrected data D_WTE<0:127> according to the write DBI signal DBI_WT<0:15>. The DBI calculation circuit 233 may generate the read DBI signal DBI_RD<0:15> by using error-corrected data D2<0:127> provided from the on-chip ECC engine 250. During the read operation, the read inversion circuit 232 may generate the read data D_RD<0:127> by selectively inverting bits of the error-corrected data D2<0:127> according to the read DBI signal DBI_RD<0:15>.

During the write operation, the on-chip ECC engine 250 may generate an internal error correction code INT_P<0:7> using the write data D1<0:127>, and transmit the write data D1<0:127> and the internal error correction code INT_P<0:7> to the write circuit 202. During the read operation, the on-chip ECC engine 250 may generate the error-corrected data D2<0:127> by correcting an error in data D1'<0:127> provided from the read circuit 203 using an internal error correction code INT_P'<0:7> transmitted from the read circuit 203.

The link ECC engine 210 and the on-chip ECC engine 250 may perform an error correction operation using different ECC methods or the same ECC methods. For example, the link ECC engine 210 uses a single error correction and double error detection (SECDED) code which corrects one error bit and detects two error bits in data based on a hamming code, or a cyclic redundancy check (CRC) code. In contrast, the on-chip ECC engine 250 may use a single error correction (SEC) code which corrects one error bit in data based on a hamming code, or a SECDED code. In FIG. 2, it is shown that the internal error correction code INT_P<0:7> or INT_P'<0:7> used by the on-chip ECC engine 250 consists of fewer bits (e.g., 8-bit) than the error correction code P_WT<0:8> or P_RD<0:8> used by the link ECC engine 210. However, the embodiments of the present disclosure are not limited to this. Depending on the specification, the internal error correction code INT_P<0:7> and the error correction code P_WT<0:8> may be set to the same bits or different bits.

During the write operation, the write circuit 202 may write, to the memory core 201, the write data D1<0:127> and the internal error correction code INT_P<0:7>. The write circuit 202 may perform a DM operation for masking some bits of the write data D1<0:127> and the internal error correction code INT_P<0:7> according to the DM signal DM_BL<0:15>.

During the read operation, the read circuit 203 may read the data D1'<0:127> and the internal error correction code INT_P'<0:7> from the memory core 201.

Figure 3:
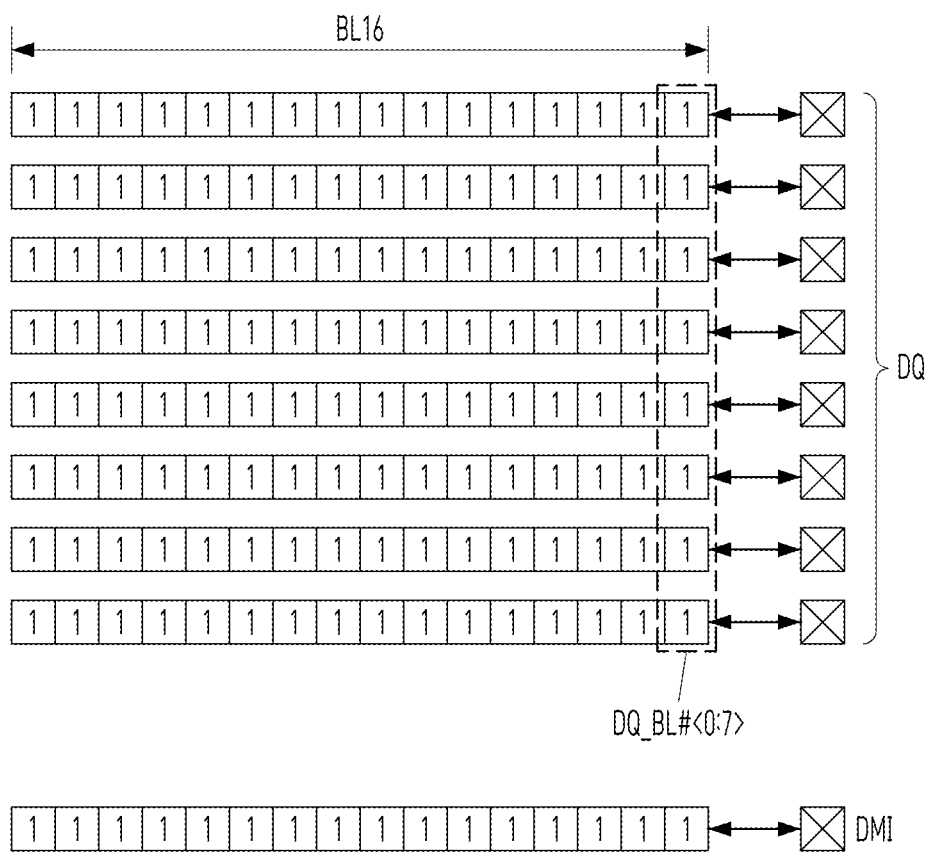
FIG. 3 is a diagram for describing a configuration of input/output signals in FIG. 2.

In the memory device, the number of bits of data input and output at a time may be determined according to burst lengths. For example, referring to FIG. 3, when the burst lengths are set to 16 (i.e., BL16), 128-bit data DQ may be input and output through eight data pads P1, and 8-bit data may be input and output per burst length. Hereinafter, data input and output per burst length will be defined as burst data DQ_BL#<0:7>, where the reference numeral # may be determined according to the set burst lengths. For reference, referring to FIG. 3, for the burst lengths BL16, the 16-bit information signal DMI may be input and output in series through the information pad P3.

Figure 4:
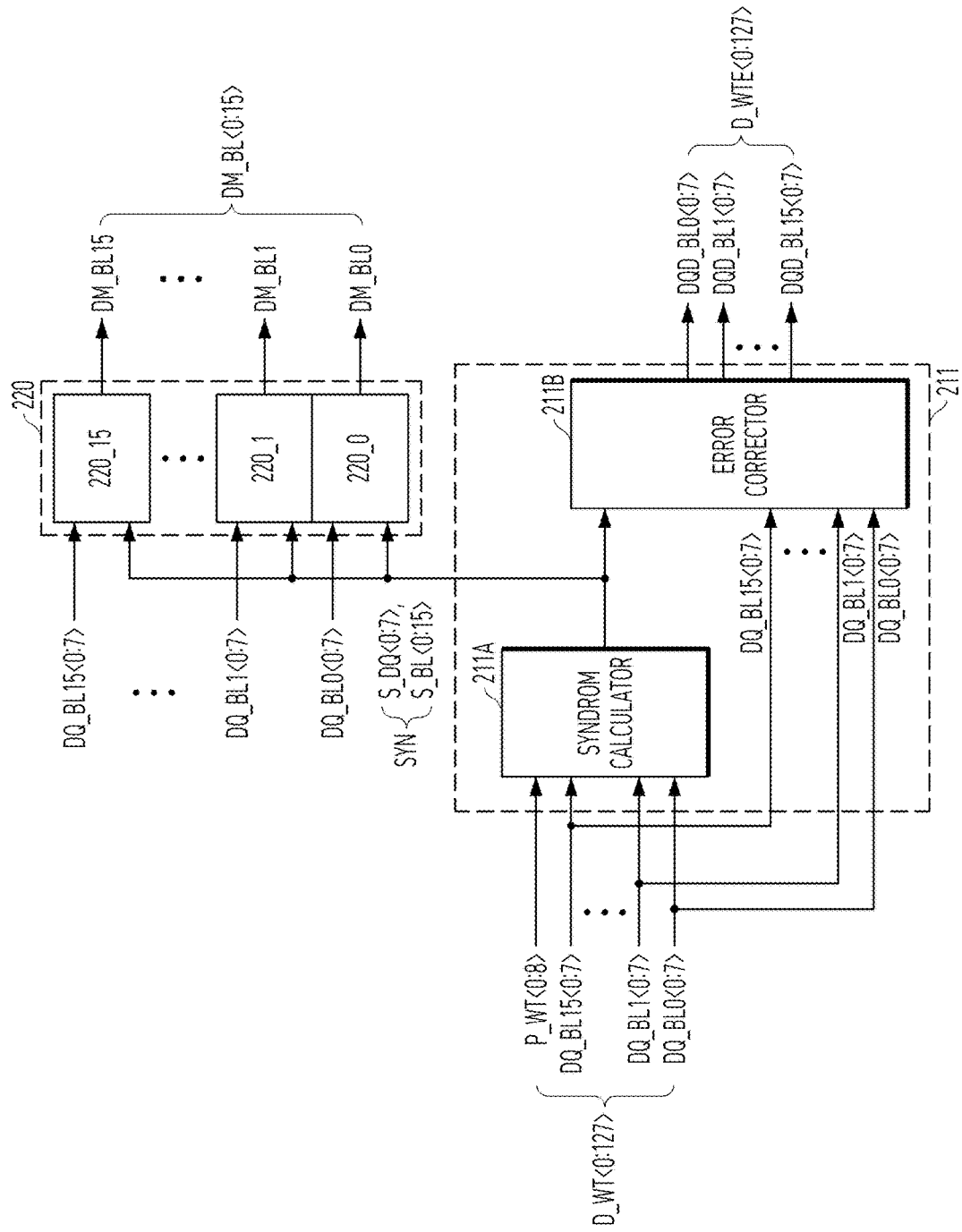
FIG. 4 is a detailed configuration diagram illustrating a write error correction circuit and a DM calculation circuit of FIG. 2.

FIG. 4 is a detailed configuration diagram illustrating the write error correction circuit 211 and the DM calculation circuit 220 of FIG. 2. In the illustrated example of FIG. 4, the write data D_WT<0:127> is composed of first to sixteenth burst data DQ_BL0<0:7> to DQ_BL15<0:7>.

Referring to FIG. 4, the write error correction circuit 211 may include a syndrome calculator 211A and an error corrector 211B.

The syndrome calculator 211A may generate a preliminary error correction code (e.g., E_P<0:8> of FIG. 5) using the first to sixteenth burst data DQ_BL0<0:7> to DQ_BL15<0:7> and generate the syndrome SYN by comparing the preliminary error correction code E_P<0:8> with the write error correction code P_WT<0:8>. The syndrome SYN may include a first error location signal S_BL<0:15> and a second error location signal S_DQ<0:7>. The first error location signal S_BL<0:15> may include information on a burst length during which data having an error is input, among the 16 burst lengths. The second error location signal S_DQ<0:7> may include information on a data pad into which data having an error is input, among the data pads P1. That is, any bit of burst data where an error is located, among the first to sixteenth burst data DQ_BL0<0:7> to DQ_BL15<0:7>, may be specified by the first error location signal S_BL<0:15> and the second error location signal S_DQ<0:7>. A detailed configuration of the syndrome calculator 211A will be described with reference to FIG. 5.

The error corrector 211B may generate the first to sixteenth error-corrected burst data DQD_BL0<0:7> to DQD_BL15<0:7> by correcting an error in the first to sixteenth burst data DQ_BL0<0:7> to DQ_BL15<0:7> according to the first error location signal S_BL<0:15> and the second error location signal S_DQ<0:7>. The first to sixteenth error-corrected burst data DQD_BL0<0:7> to DQ_BL15<0:7> may constitute the error-corrected data D_WTE<0:127>. A detailed configuration of the error corrector 211B will be described with reference to FIGS. 6A and 6B.

The DM calculation circuit 220 may include first to sixteenth DM calculators 220_0 to 220_15 corresponding to the first to sixteenth burst data DQ_BL0<0:7> to DQ_BL15<0:7> to generate first to sixteenth DM signals DM_BL0 to DM_BL15 corresponding to each burst length, respectively. Each of the DM calculators 220_0 to 220_15 may generate a corresponding DM signal by counting the number of logic high bits of a corresponding burst data. Each of the DM calculators 220_0 to 220_15 may generate an increase signal and/or a decrease signal by detecting whether an error occurs in the corresponding burst data according to the first error location signal S_BL<0:15> and the second error location signal S_DQ<0:7>, and change the corresponding DM signal according to the increase signal and/or the decrease signal. The first to sixteenth DM signals DM_BL0 to DM_BL15 may constitute the DM signal DM_BL<0:15>. A detailed configuration of the DM calculation circuit 220 will be described with reference to FIGS. 7 to 19.

Figure 5:
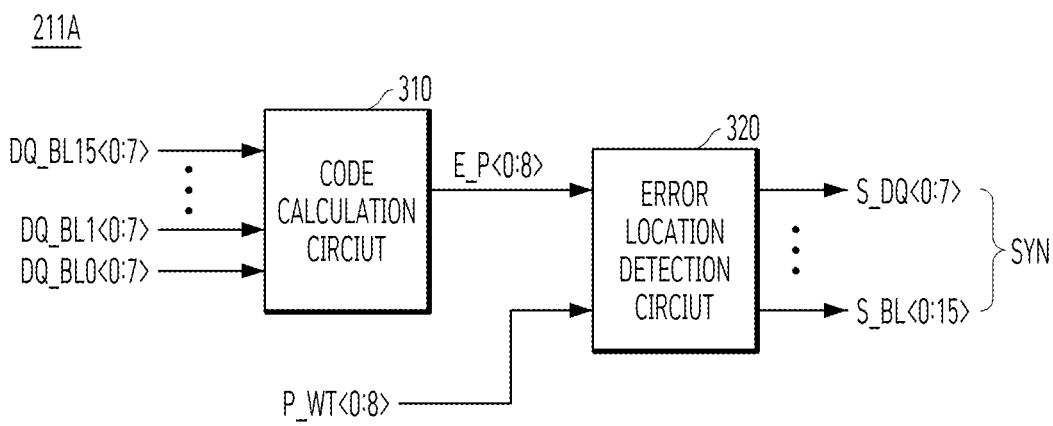
FIG. 5 is a detailed configuration diagram illustrating a syndrome calculator of FIG. 4.

FIG. 5 is a detailed configuration diagram illustrating the syndrome calculator 211A of FIG. 4.

Referring to FIG. 5, the syndrome calculator 211A may include a code calculation circuit 310 and an error location detection circuit 320.

The code calculation circuit 310 may generate the preliminary error correction code E_P<0:8> using the first to sixteenth burst data DQ_BL0<0:7> to DQ_BL15<0:7>. For example, the code calculation circuit 310 may generate the preliminary error correction code E_P<0:8> using a check matrix also called H matrix. However, the embodiments of the present disclosure are not limited thereto, and the code calculation circuit 310 may generate the preliminary error correction code E_P<0:8> by applying a known BCH code, Hamming code, RS code, or the like, or may generate the preliminary error correction code E_P<0:8> by applying another type of parity code.

The error location detection circuit 320 may compare the preliminary error correction code E_P<0:8> with the write error correction code P_WT<0:8> for each bit to generate the first error location signal S_BL<0:15> indicating a burst length in which error exists, and the second error location signal S_DQ<0:7> indicating a data pad in which error exists.

Figure 6A:
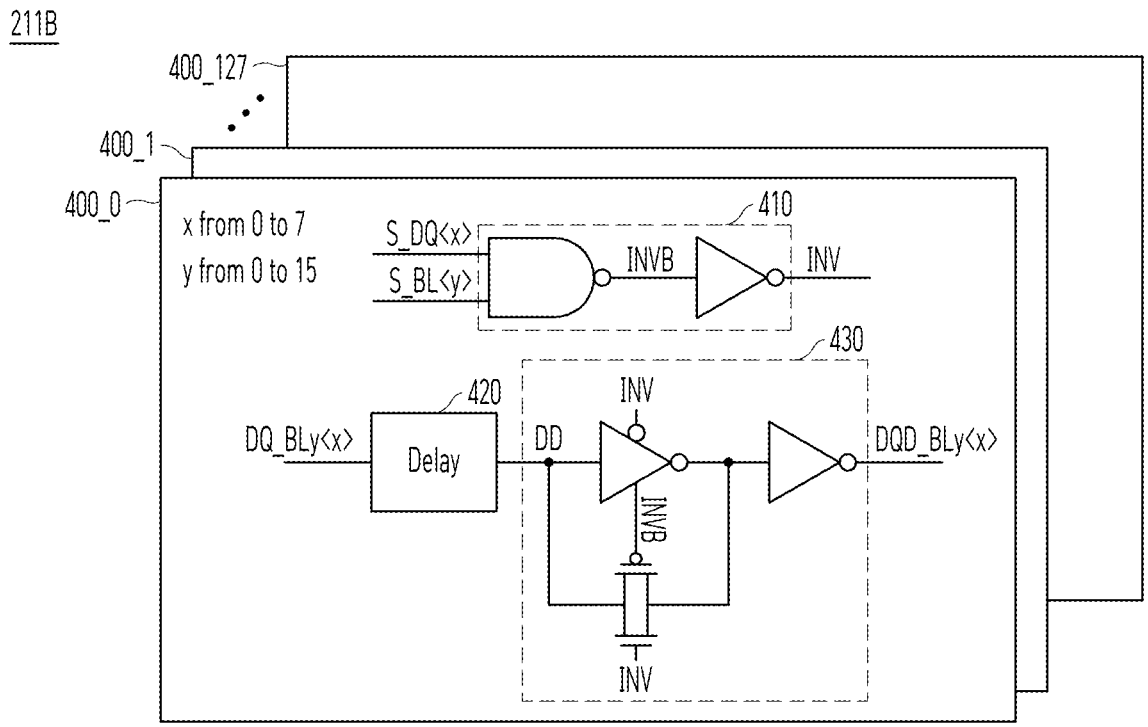
FIGS. 6A and 6B are a circuit diagram and a waveform diagram illustrating an error corrector of FIG. 4.
Figure 6B:
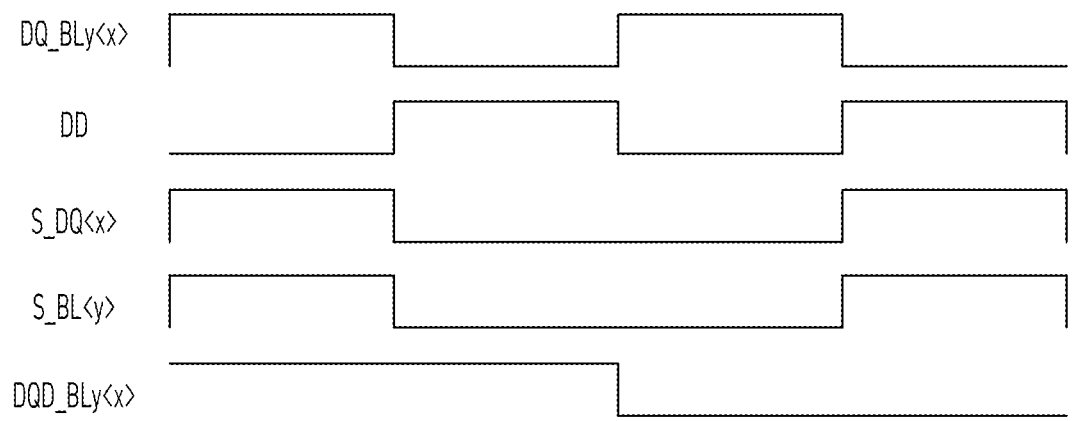

FIGS. 6A and 6B are a circuit diagram and a waveform diagram illustrating the error corrector 211B of FIG. 4.

Referring to FIG. 6A, the error corrector 211B may include first to 128-th error correction parts 400_0 to 400_127 corresponding to each bit of the write data D_WT<0:127>.

Each of the first to 128-th error correction parts 400_0 to 400_127 may receive a bit S_BL<y> of the first error location signal S_BL<0:15> corresponding to its burst length and a bit S_DQ<x> of the second error location signal S_DQ<0:7> corresponding to its data pad. Hereinafter, the bit S_BL<y> is referred to as a first error location bit S_BL<y>, and the bit S_DQ<x> is referred to as a second error location bit S_DQ<x>. Each of the first to 128-th error correction parts 400_0 to 400_127 may include an inversion control section 410, a delay 420, and an inversion section 430.

The inversion control section 410 may generate a first inversion control signal INV and a second inversion control signal INVB according to the first error location bit S_BL<y> and the second error location bit S_DQ<x>. For example, the inversion control section 410 may generate the second inversion control signal INVB by performing a logic NAND operation on the first error location bit S_BL<y> and the second error location bit S_DQ<x>, and generate the first inversion control signal INV by inverting the second inversion control signal INVB. The inversion control section 410 may generate the second inversion control signal INV to a logic high level when both the first error location bit S_BL<y> and the second error location bit S_DQ<x> become a logic high level.

The delay 420 may generate a delay signal DD by delaying an input bit DQ_BLy<x> for a predetermined time.

The inversion section 430 may generate an output bit DQD_BLy<x> by selectively inverting the delay signal DD according to the first inversion control signal INV and the second inversion control signal INVB. The output bit DQD_BLy<x> may constitute a bit of error-corrected burst data. For example, when the first inversion control signal INV becomes a logic high level, the inversion section 430 may invert the delay signal DD to output the inverted delay signal as the output bit DQD_BLy<x>. When the second inversion control signal INVB becomes a logic high level, the inversion section 430 may output the delay signal DD as the output bit DQD_BLy<x>.

Referring to FIG. 6B, when both the first error location bit S_BL<y> and the second error location bit S_DQ<x> become a logic high level, the first inversion control signal INV becomes a logic high level. The inverting section 430 may invert the delay signal DD to output the inverted delay signal as the output bit DQD_BLy<x>. On the other hand, when one of the first error location bit S_BL<x> and the second error location bit S_DQ<y> becomes a logic low level, the second inversion control signal INVB becomes a logic high level. The inverting section 430 may output the delay signal DD as an output bit DQD_BLy<x> without inversion.

With the above configuration, one of the first to 128-th error correction parts 400_0 to 400_127 may be selected by the first error location signal S_BL<0:15> and the second error location signal S_DQ<0:7>. The selected error correction part may invert (i.e., error correct) the input bit DQ_BLy<x> to output the output bit DQD_BLy<x>.

Figure 7:
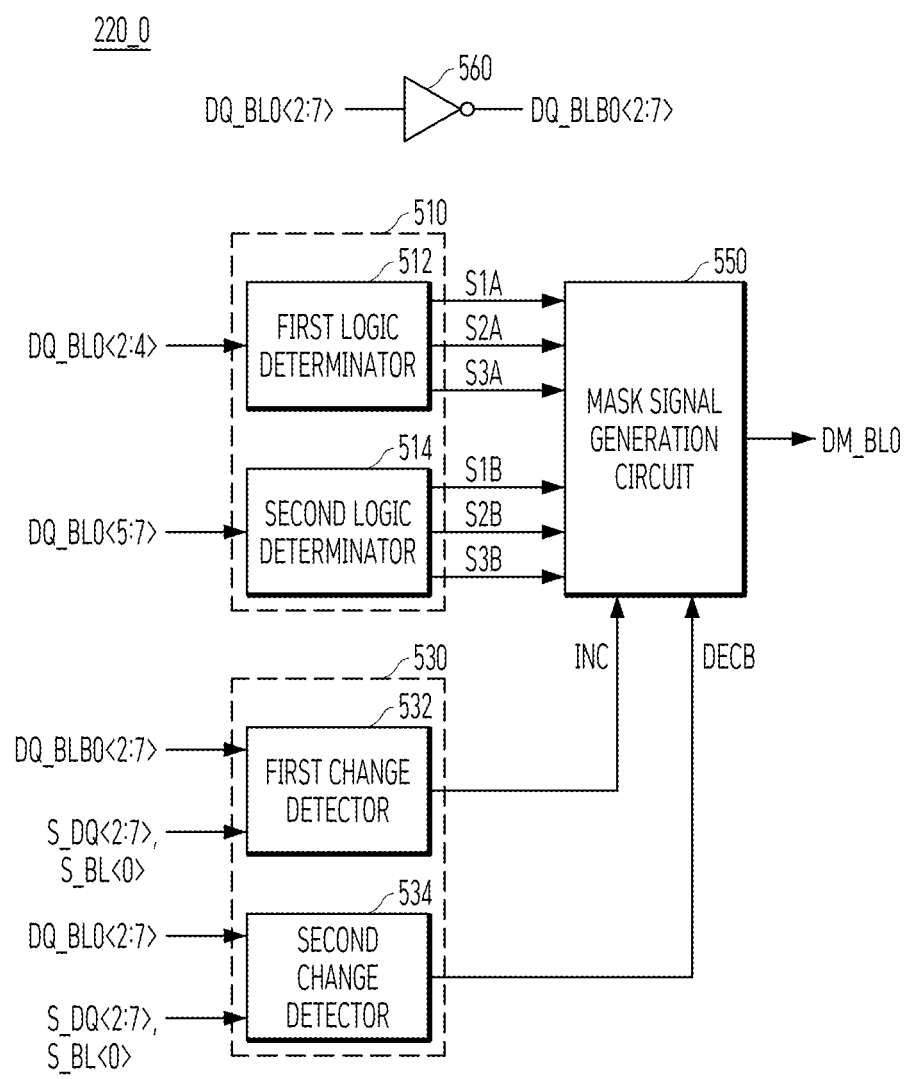
FIG. 7 is a detailed block diagram illustrating any one DM calculator according to an embodiment of the present disclosure.

FIG. 7 is a detailed block diagram illustrating the first DM calculator 220_0 according to an embodiment of the present disclosure. FIG. 8 is a table for describing an operation of the DM calculator 220_0 of FIG. 7. Each of the second to sixteenth DM calculators 220_1 to 220_15 may have substantially the same configuration as the first DM calculator 220_0.

Referring to FIG. 7, the first DM calculator 220_0 may include a logic determination circuit 510, an error change detection circuit 530, and a mask signal generation circuit 550. The first DM calculator 220_0 may further include an inversion logic 560 for generating inversion data DQ_BLB0<2:7> by inverting the first burst data DQ_BL0<2:7>.

The logic determination circuit 510 may generate high-bit signals S1A, S2A, S3A, S1B, S2B, and S3B, respectively, indicating the number of logic high bits of the first burst data DQ_BL0<0:7>. The logic determination circuit 510 may divide the remaining six bits DQ_BL0<2:7> of the first burst data DQ_BL0<0:7>, except for least significant bits DQ_BL0<0:1>, into lower bits DQ_BL0<2:4> and upper bits DQ_BL0<5:7> to generate first to sixth high-bit signals S1A, S2A, S3A, S1B, S2B, and S3B by counting the number of high bits of the lower bits DQ_BL0<2:4> and the upper bits DQ_BL0<5:7>, respectively.

In more detail, the logic determination circuit 510 may include a first logic determinator 512 and a second logic determinator 514. The first logic determinator 512 may generate the first to third high-bit signals S1A, S2A, and S3A indicating the number of logic high bits of the lower bits DQ_BL0<2:4>. When there is one or more logic high bits among the lower bits DQ_BL0<2:4>, the first logic determinator 512 may activate one of the first to third high-bit signals S1A, S2A, and S3A. The second logic determinator 514 may generate the fourth to sixth high-bit signals S1B, S2B, and S3B indicating the number of logic high bits of the upper bits DQ_BL0<5:7>. For example, when there is one or more logic high bits among the upper bits DQ_BL0<5:7>, the second logic determinator 514 may activate one of the fourth to sixth high-bit signals S1B, S2B, and S3B.

The error change detection circuit 530 may be activated according to the first error location signal S_BL<0:15>, and generate an increase signal INC or a decrease signal DECB by detecting whether an error bit exists in the first burst data DQ_BL0<2:7> according to the second error location signal S_DQ<2:7>. The error change detection circuit 530 may be activated according to a corresponding bit (i.e., a first bit S_BL<0>) of the first error location signal S_BL<0:15>, which corresponds to the first burst data DQ_BL0<2:7>. In an embodiment of the present disclosure, the error change detection circuit 530 may activate the increase signal INC when an error bit exists among logic low bits of the first burst data DQ_BL0<2:7> and activate the decrease signal DECB when an error bit exists among logic high bits of the first burst data DQ_BL0<2:7>.

In more detail, the error change detection circuit 530 may include a first change detector 532 and a second change detector 534.

The first change detector 532 may be activated according to the first bit S_BL<0> of the first error location signal S_BL<0:15> and activate the increase signal INC when respective bits of the inversion data DQ_BLB0<2:7> and the second error location signal S_DQ<2:7> are both logic high bits. For example, the first change detector 532 may activate the increase signal INC when the first bit S_BL<0> of the first error location signal S_BL<0:15> is a logic high bit and when a bit DQ_BLB0<3> of the inversion data DQ_BLB0<2:7> and a bit S_DQ<3> of the second error location signal S_DQ<2:7> become logic high bits.

The second change detector 534 may be activated according to the first bit S_BL<0> of the first error location signal S_BL<0:15>, and activate the decrease signal DECB when the respective bits of the first burst data DQ_BL0<2:7> and the second error location signal S_DQ<2:7> are both logic high bits. For example, the second change detector 534 may activate the decrease signal DECB when the first bit S_BL<0> of the first error location signal S_BL<0:15> is a logic high bit and when a bit DQ_BL<3> of the first burst data DQ_BL0<2:7> and a bit S_DQ<3> of the second error location signal S_DQ<2:7> become logic high bits. In this embodiment, the increase signal INC may be activated to a logic high level, and the decrease signal DECB may be activated to a logic low level.

The mask signal generation circuit 550 may generate the first DM signal DM_BL0 based on the first to sixth high-bit signals S1A, S2A, S3A, S1B, S2B, and S3B, and change a logic level of the first DM signal DM_BL0 according to the increase signal INC and the decrease signal DECB.

In an embodiment of the present disclosure, the mask signal generation circuit 550 may activate the first DM signal DM_BL0 when the number of logic high bits of the first burst data DQ_BL0<2:7> is greater than or equal to a reference value. In addition, when the number of logic high bits is equal to the reference value or a boundary value, the mask signal generation circuit 550 may change the logic level of the first DM signal DM_BL0 according to the increase signal INC and the decrease signal DECB. Both the reference value and the boundary value are positive integers, and the boundary value may be set to a number less than the reference value by 1.

In FIG. 8, the reference value is set to 5, and the boundary value is set to 4. When the third high-bit signal S3A and the sixth high-bit signal S3B are activated, when the third high-bit signal S3A and the fifth high-bit signal S2B are activated, or when the second high-bit signal S2A and the sixth high-bit signal S3B are activated, the mask signal generation circuit 550 may determine that the number of logic high bits is greater than or equal to the reference value of 5, thereby activating the first DM signal DM_BL0. When the third high-bit signal S3A and the fifth high-bit signal S2B are activated, or when the second high-bit signal S2A and the sixth high-bit signal S3B are activated, the mask signal generation circuit 550 may determine that the number of logic high bits is equal to the reference value of 5 (marked with dots), thereby changing the logic level of the first DM signal DM_BL0 according to the decrease signal DECB. When the first high-bit signal S1A and the sixth high-bit signal S3B are activated, the second high-bit signal S2A and the fifth high-bit signal S2B are activated, or when the third high-bit signal S3A and the fourth high-bit signal S1B are activated, the mask signal generation circuit 550 may determine that the number of logic high bits is equal to the boundary value of 4 (marked with diagonal lines), thereby changing the logic level of the first DM signal DM_BL0 according to the increase signal INC.

Figure 9:
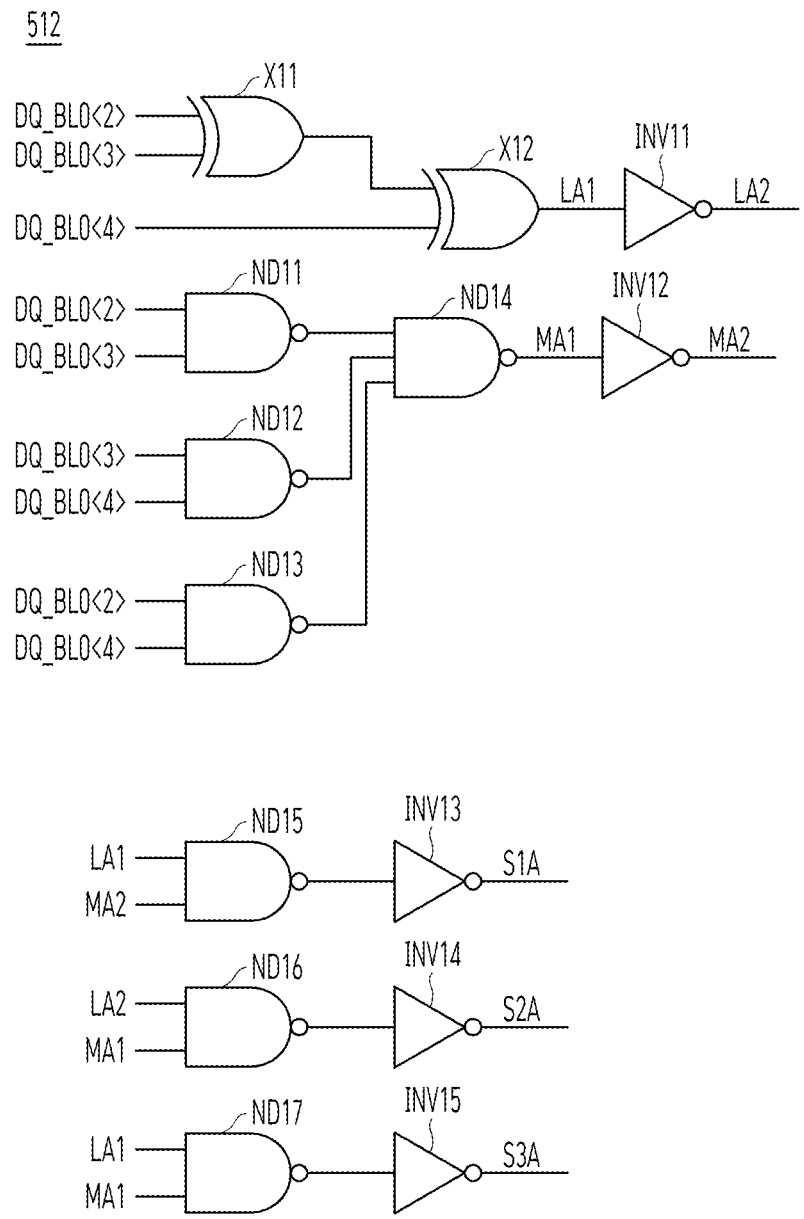
FIG. 9 is a circuit diagram illustrating a first logic determinator of FIG. 7.

FIG. 9 is a circuit diagram illustrating the first logic determinator 512 of FIG. 7.

Referring to FIG. 9, the first logic determinator 512 may include first and second exclusive OR (XOR) gates X11 and X12, first to seventh NAND gates ND11 to ND17, and first to fifth inverters INV11 to INV15.

The first and second XOR gates X11 and X12 may generate a first determination signal LA1 by performing a logic XOR operation on the lower bits DQ_BL0<2:4>. The first inverter INV11 may generate a second determination signal LA2 by inverting the first determination signal LA1. With the above configuration, the first determination signal LA1 may be activated to a logic high level when an even number of logic low bits among the lower bits DQ_BL0<2:4> exists, and the second determination signal LA2 may be activated to a logic high level when an even number of logic high bits among the lower bits DQ_BL0<2:4> exists.

The first NAND gate ND11 may perform a logic NAND operation on the lower bit DQ_BL0<2> and the lower bit DQ_BL0<3>. The second NAND gate ND12 may perform a logic NAND operation on the lower bit DQ_BL0<3> and the lower bit DQ_BL0<4>. The third NAND gate ND13 may perform a logic NAND operation on the lower bit DQ_BL0<2> and the lower bit DQ_BL0<4>. The fourth NAND gate ND14 may perform a logic NAND operation on outputs of the first to third NAND gates ND11 to ND13 to generate a third determination signal MA1. The second inverter INV12 may invert the third determination signal MA1 to generate a fourth determination signal MA2. With the above configuration, the third determination signal MA1 may be activated to a logic high level when at least two of the lower bits DQ_BL0<2:4> are logic high bits, and the fourth determination signal MA2 may be activated to a logic high level when at least two of the lower bits DQ_BL0<2:4> are logic low bits.

The fifth NAND gate ND15 and the third inverter INV13 may generate the first high-bit signal S1A by performing a logic AND operation on the first determination signal LA1 and the fourth determination signal MA2. Accordingly, the first high-bit signal S1A may be activated to a logic high level when there is one logic high bit among the lower bits DQ_BL0<2:4>.

The sixth NAND gate ND16 and the fourth inverter INV14 may generate the second high-bit signal S2A by performing a logic AND operation on the second determination signal LA2 and the third determination signal MA1. Accordingly, the second high-bit signal S2A may be activated to a logic high level when there are two high bits among the logic lower bits DQ_BL0<2:4>.

The seventh NAND gate ND17 and the fifth inverter INV15 may generate the third high-bit signal S3A by performing a logic AND operation on the first determination signal LA1 and the third determination signal MA1. Accordingly, the third high-bit signal S3A may be activated to a logic high level when there are three logic high bits among the lower bits DQ_BL0<2:4>.

Figure 10:
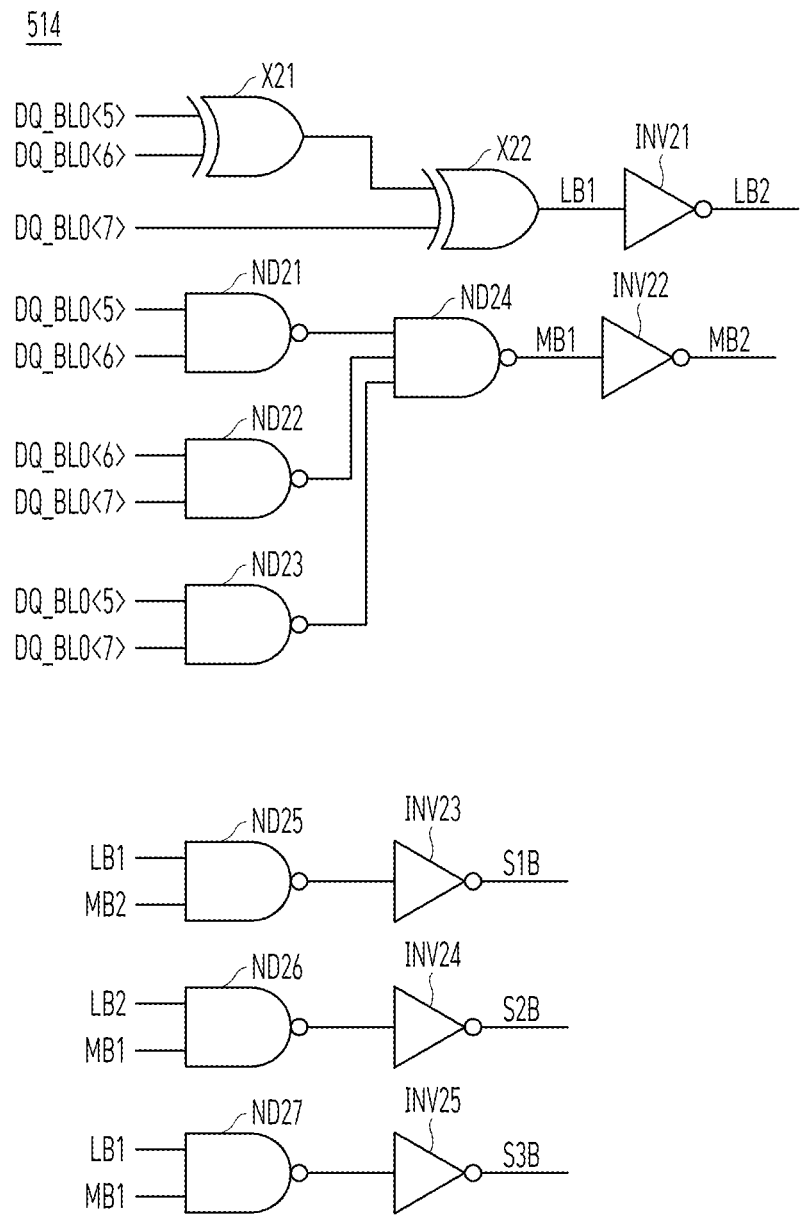
FIG. 10 is a circuit diagram illustrating a second logic determinator of FIG. 7.

FIG. 10 is a circuit diagram illustrating the second logic determinator 514 of FIG. 7.

Referring to FIG. 10, the second logic determinator 514 may include first lower second XOR gates X21 and X22, first to seventh NAND gates ND21 to ND27, and first to fifth inverters INV21 to INV25. Since the second logic determinator 514 has substantially the same configuration as the first logic determinator 512, a detailed description thereof will be omitted.

With the above configuration, the second logic determinator 514 may activate the fourth high-bit signal S1B to a logic high level when there is one logic high bit among the upper bits DQ_BL0<5:7>, activate the fifth high-bit signal S2B to a logic high level when there are two logic high bits among the upper bits DQ_BL0<5:7>, and activate the sixth high-bit signal S3B to a logic high level when there are three logic high bits among the upper bits DQ_BL0<5:7>.

Figure 11:
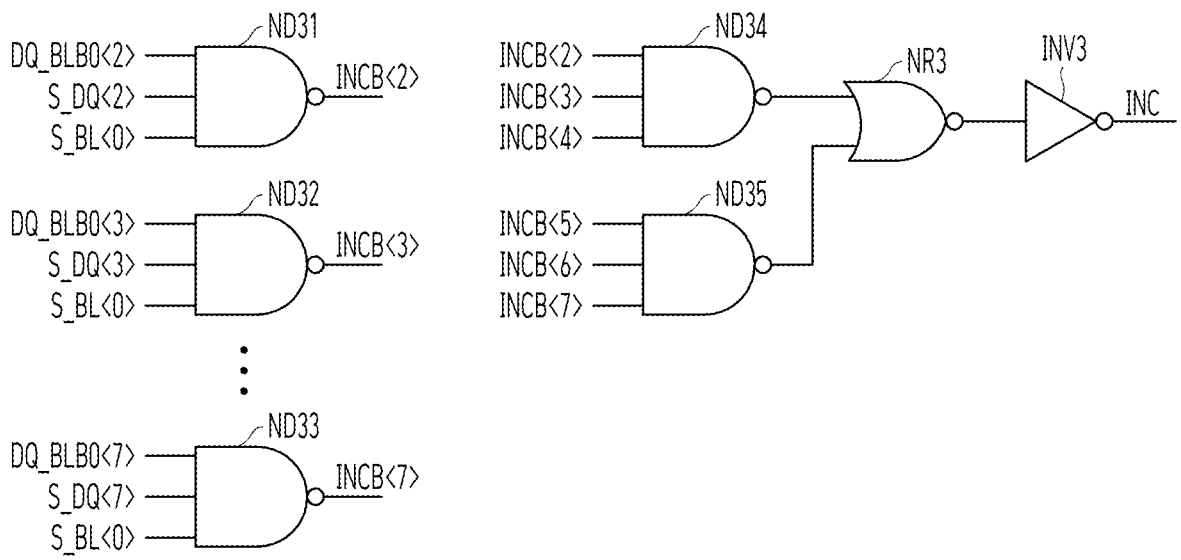
FIG. 11 is a circuit diagram illustrating a first change detector of FIG. 7.

FIG. 11 is a circuit diagram illustrating the first change detector 532 of FIG. 7.

Referring to FIG. 11, the first change detector 532 may include first to fifth NAND gates ND31 to ND35, a NOR gate NR3, and an inverter INV3.

The first to third NAND gates ND31 to ND33 may generate increase detection bits INCB<2:7> by performing a logic NAND operation on respective bits of the inversion data DQ_BLB0<2:7>, respective bits of the second error location signal S_DQ<2:7>, and the first bit S_BL<0> of the first error location signal S_BL<0:15>. When the first bit S_BL<0> becomes a logic high bit, each of the first to third NAND gates ND31 to ND33 may output a corresponding increase detection bit to a logic low bit when a corresponding bit of the inversion data DQ_BLB0<2:7> and a corresponding bit of the second error location signal S_DQ<2:7> are both logic high bits.

The fourth NAND gate ND34 may perform a logic NAND operation on the increase detection bits INCB<2:4>. The fifth NAND gate ND35 may perform a logic NAND operation on the increase detection bits INCB<5:7>. The NOR gate NR3 and the inverter INV3 may generate the increase signal INC by performing a logic OR operation on outputs of the fourth and fifth NAND gates ND34 and ND35. That is, when one of the increase detection bits INCB<2:7> becomes a logic low bit, the increase signal INC may be activated to a logic high level.

With the above configuration, the first change detector 532 may be activated according to the first bit S_BL<0> of the first error location signal S_BL<0:15>, and output the increase signal INC activated to a logic high level when a logic high bit of the inversion data DQ_BLB0<2:7>, that is, a logic low bit of the first burst data DQ_BL0<2:7>, is detected as an error bit.

Figure 12:
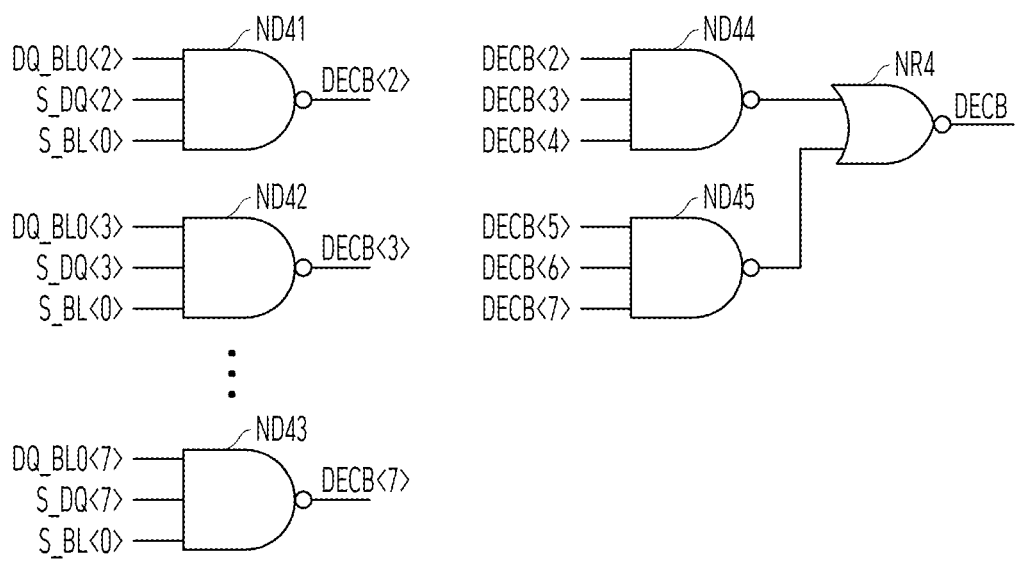
FIG. 12 is a circuit diagram illustrating a second change detector of FIG. 7.

FIG. 12 is a circuit diagram illustrating the second change detector 534 of FIG. 7.

Referring to FIG. 12, the second change detector 534 may include first to fifth NAND gates ND41 to ND45 and a NOR gate NR4.

The first to third NAND gates ND41 to ND43 may generate decrease detection bits DECB<2:7> by performing a logic NAND operation on respective bits of the first burst data DQ_BL0<2:7>, respective bits of the second error location signal S_DQ<2:7>, and the first bit S_BL<0> of the first error location signal S_BL<0:15>. When the first bit S_BL<0> becomes a logic high bit, each of the first to third NAND gates ND41 to ND43 may output a corresponding decrease detection bit to a logic low bit when a corresponding bit of the first burst data DQ_BL0<2:7> and a corresponding bit of the second error location signal S_DQ<2:7> are both logic high bits.

The fourth NAND gate ND44 may perform a logic NAND operation on the decrease detection bits DECB<2:4>. The fifth NAND gate ND45 may perform a logic NAND operation on the decrease detection bits DECB<5:7>. The NOR gate NR4 may generate the decrease signal DECB by performing a logic NOR operation on outputs of the fourth and fifth NAND gates ND44 and ND45. That is, when one of the decrease detection bits DECB<2:7> becomes a logic low bit, the decrease signal DECB may be activated to a logic low level.

With the above configuration, the second change detector 534 may be activated according to the first bit S_BL<0> of the first error location signal S_BL<0:15>, and output the decrease signal DECB activated to logic low level when a logic high bit of the first burst data DQ_BL0<2:7> is detected as an error bit.

Figure 13:
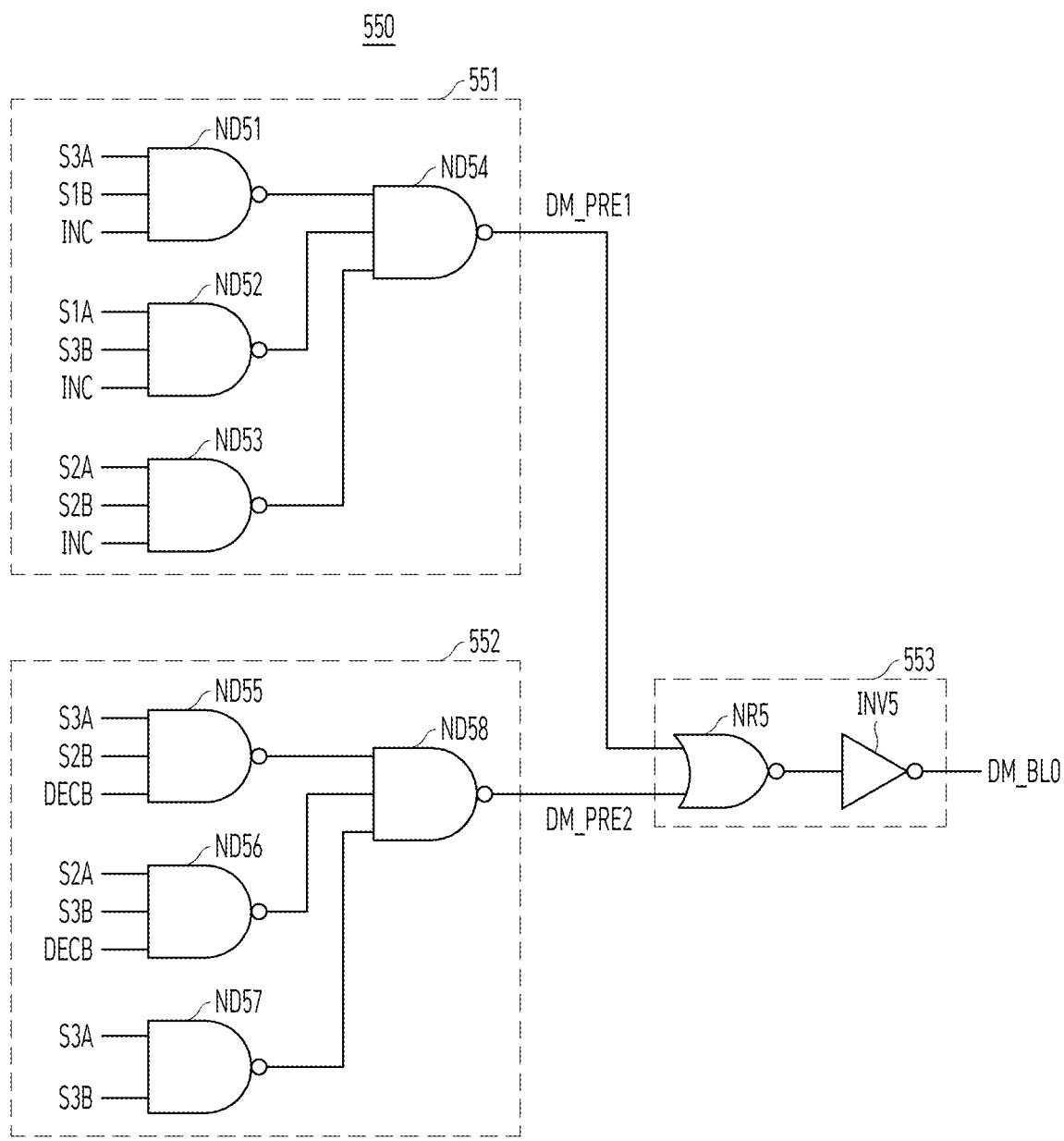
FIG. 13 is a circuit diagram illustrating a mask signal generation circuit of FIG. 7.

FIG. 13 is a circuit diagram illustrating the mask signal generation circuit 550 of FIG. 7.

Referring to FIG. 13, the mask signal generation circuit 550 may include a first signal generator 551, a second signal generator 552, and a signal combiner 553.

The first signal generator 551 may generate a first preliminary signal DM_PRE1 activated to a logic high level, when the increase signal INC is activated, by detecting a case in which the number of logic high bits of the first burst data DQ_BL0<2:7> is equal to a boundary value based on the first to sixth high-bit signals S1A, S2A, S3A, S1B, S2B, and S3B.

In more detail, the first signal generator 551 may include first to fourth NAND gates ND51 to ND54. The first NAND gate ND51 may perform a logic NAND operation on the increase signal INC, the third high-bit signal S3A, and the fourth high-bit signal S1B. The second NAND gate ND52 may perform a logic NAND operation on the increase signal INC, the first high-bit signal S1A, and the sixth high-bit signal S3B. The third NAND gate ND53 may perform a logic NAND operation on the increase signal INC, the second high-bit signal S2A, and the fifth high-bit signal S2B. The fourth NAND gate ND54 may perform a logic NAND operation on outputs of the first to third NAND gates ND51 to ND53.

The second signal generator 552 may generate a second preliminary signal MD_PRE2 activated to a logic high level, by detecting a case in which the number of logic high bits of the first burst data DQ_BL0<2:7> is greater than or equal to a reference value based on the first to sixth high-bit signals S1A, S2A, S3A, S1B, S2B, and S3B, while deactivating the second preliminary signal MD_PRE2 to a logic low level when the decrease signal DECB is activated to a logic low level in a state that the number of logic high bits is equal to the reference value.

In more detail, the second signal generator 552 may include fifth to eighth NAND gates ND55 to ND58. The fifth NAND gate ND55 may perform a logic NAND operation on the decrease signal DECB, the third high-bit signal S3A, and the fifth high-bit signal S2B. The sixth NAND gate ND56 may perform a logic NAND operation on the decrease signal DECB, the second high-bit signal S2A, and the sixth high-bit signal S3B. The seventh NAND gate ND57 may perform a logic NAND operation on the third high-bit signal S3A and the sixth high-bit signal S3B. The eighth NAND gate ND58 may perform a logic NAND operation on outputs of the fifth to seventh NAND gates ND55 to ND57.

The signal combiner 553 may generate the first DM signal DM_BL0 according to the first preliminary signal MD_PRE1 and the second preliminary signal MD_PRE2. For example, the signal combiner 553 may include a NOR gate NR5 and an inverter INV5 to perform a logic OR operation on the first preliminary signal MD_PRE1 and the second preliminary signal MD_PRE2. That is, the signal combiner 553 may generate the first DM signal DM_BL0 that is activated to a logic high level when one of the first preliminary signal MD_PRE1 and the second preliminary signal MD_PRE2 is activated.

Hereinafter, an operation of the first DM calculator 220_0 described with reference to FIGS. 7 to 13 will be described.

Figure 14A:
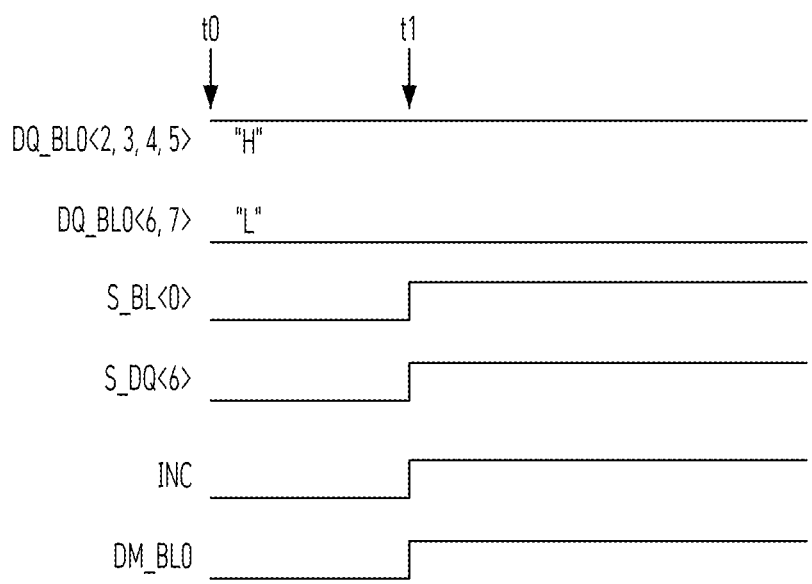
FIGS. 14A and 14B are waveform diagrams for explaining an operation of the DM calculator of FIG. 7.
Figure 14B:
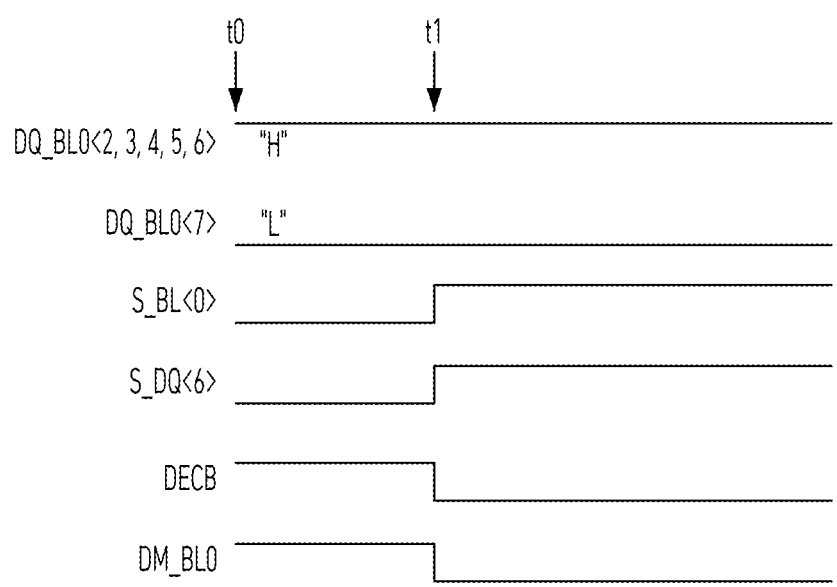

FIGS. 14A and 14B are waveform diagrams for describing an operation of the first DM calculator 220_0 of FIG. 7.

Referring to FIG. 14A, a case where some bits DQ_BL0<2,3,4,5> of the first burst data DQ_BL0<2:7> are logic high bits and the remaining bits DQ_BL0<6,7> are logic low bits is illustrated.

At a time point t0, the logic determination circuit 510 may detect logic high bits of the first burst data DQ_BL0<2:7> to activate the third high-bit signal S3A and the fourth high-bit signal S1B. Accordingly, the mask signal generation circuit 550 may deactivate the first DM signal DM_BL0 to a logic low level because the number of logic high bits of the first burst data DQ_BL0<2:7> is equal to a boundary value of 4 less than a reference value of 5.

At a time point t1, the bit DQ_BL<6> of the first burst data DQ_BL0<0:7> is detected as an error bit. Thus, the first bit S_BL<0> of the first error location signal S_BL<0:15> and the bit S_DQ<6> of the second error location signal S_DQ<0:7> become logic high bits. In this case, since the bit DQ_BL<6> of the first burst data DQ_BL0<0:7> is a logic low bit, the error change detection circuit 530 may output the increase detection bit INCB<6> to a logic low level, thereby activating the increase signal INC to a logic high level. Accordingly, the mask signal generation circuit 550 may activate the first DM signal DM_BL0 to a logic high level.

Referring to FIG. 14B, a case where some bits DQ_BL0<2,3,4,5,6> of the first burst data DQ_BL0<2:7> are logic high bits, and only the bit DQ_BL0<7> is a low bit is illustrated.

At a time point t0, the logic determination circuit 510 may detect logic high bits of the first burst data DQ_BL0<2:7> to activate the third high-bit signal S3A and the fifth high-bit signal S2B. The mask signal generation circuit 550 may activate the DM signal DM_BL0 to a logic high level because the number of logic high bits of the first burst data DQ_BL0<2:7> is equal to a reference value of 5.

At a time point t1, the bit DQ_BL<6> of the first burst data DQ_BL0<0:7> is detected as an error bit. Thus, the first bit S_BL<0> of the first error location signal S_BL<0:15> and the bit S_DQ<6> of the second error location signal S_DQ<0:7> become logic high bits. In this case, since the bit DQ_BL<6> of the first burst data DQ_BL0<0:7> is a logic high bit, the error change detection circuit 530 may output the decrease detection bit DECB<6> to a logic low level, thereby activating the decrease signal DECB to a logic low level. Accordingly, the mask signal generation circuit 550 may deactivate the first DM signal DM_BL0 to a logic low level.

Hereinafter, a detailed configuration of the first DM calculator 220_0 according to another embodiment of the present disclosure will be described.

Figure 15:
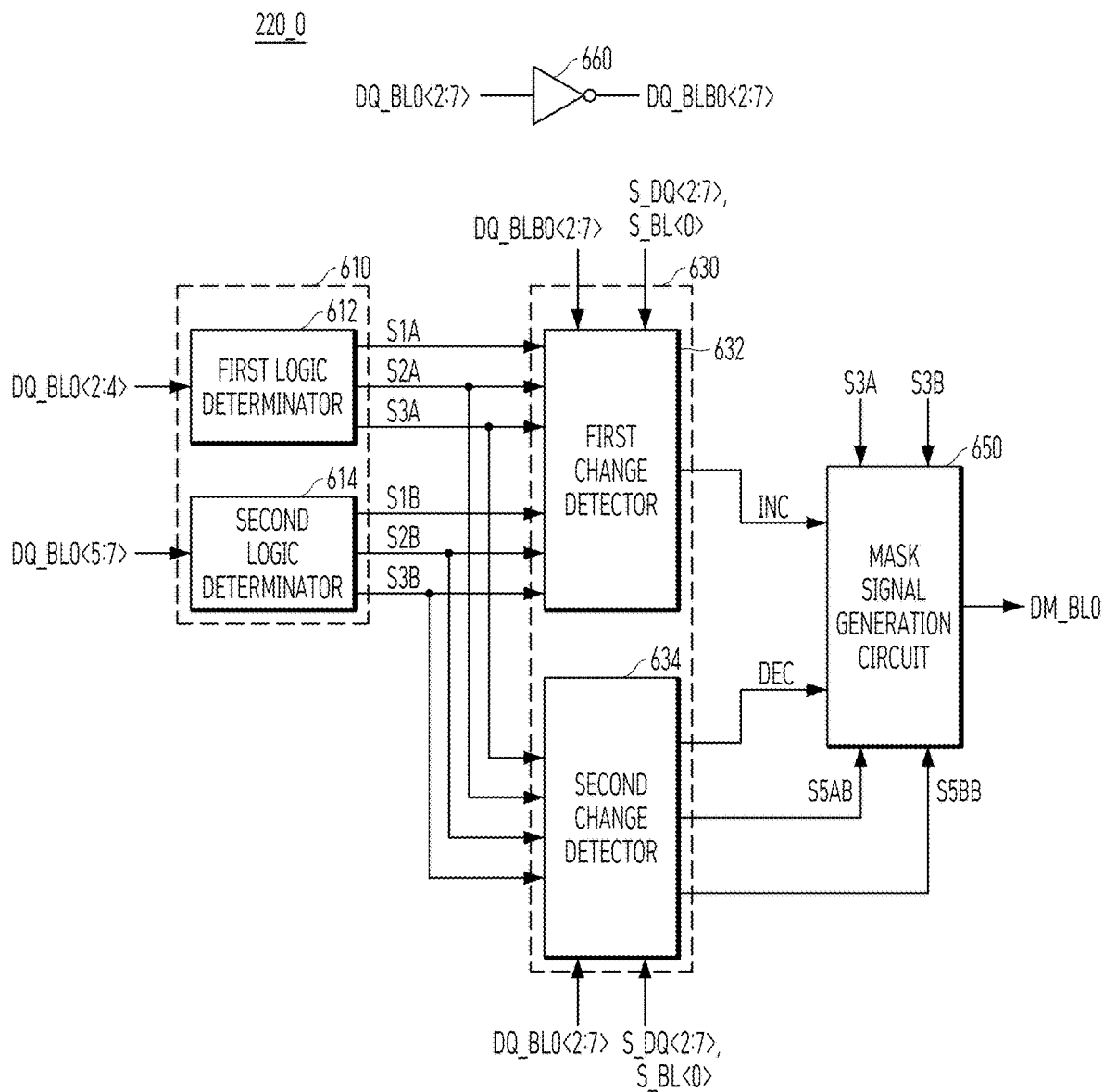
FIG. 15 is a detailed block diagram illustrating a DM calculator according to another embodiment of the present disclosure.

FIG. 15 is a detailed block diagram illustrating the first DM calculator 220_0 according to another embodiment of the present disclosure.

Referring to FIG. 15, the first DM calculator 220_0 may include a logic determination circuit 610, an error change detection circuit 630, and a mask signal generation circuit 650. The first DM calculator 220_0 may further include an inversion logic 660 for generating inversion data DQ_BLB0<2:7> by inverting the first burst data DQ_BL0<2:7>.

The logic determination circuit 610 may generate first to third high-bit signals S1A, S2A, and S3A indicating the number of logic high bits of lower bits DQ_BL0<2:4> of the first burst data DQ_BL0<2:7>, and generate fourth to sixth high-bit signals S1B, S2B, and S3B indicating the number of logic high bits of upper bits DQ_BL0<5:7> of the first burst data DQ_BL0<2:7>. The logic determination circuit 610 may include a first logic determinator 612 and a second logic determinator 614. Since the logic determination circuit 610 has substantially the same configuration as the logic determination circuit 510 of FIG. 7, a detailed description thereof will be omitted.

The error change detection circuit 630 may be activated according to a first bit S_BL<0> of a first error location signal S_BL<0:15>, and generate an increase signal INC or a decrease signal DEC by detecting whether an error bit exists in the first burst data DQ_BL0<2:7> according to a second error location signal S_DQ<2:7>. In an embodiment of the present disclosure, the error change detection circuit 630 may activate the increase signal INC or the decrease signal DEC by checking whether the number of logic high bits of the first burst data DQ_BL0<2:7> is equal to a reference value or a boundary value. In the embodiment, the increase signal INC and the decrease signal DEC may be activated to a logic high level.

In more detail, the error change detection circuit 630 may include a first change detector 632 and a second change detector 634.

The first change detector 632 may be activated according to the first bit S_BL<0> of the first error location signal S_BL<0:15>, and activate a preliminary increase signal (e.g., INCB of FIG. 16) when respective bits of the inversion data DQ_BLB0<2:7> and the second error location signal S_DQ<2:7> are both logic high bits. The first change detector 632 may activate a first detection signal DET1 by detecting a case where the number of logic high bits of the first burst data DQ_BL0<2:7> is equal to the boundary value based on the first to sixth high-bit signals S1A, S2A, S3A, S1B, S2B, and S3B. The preliminary increase signal INCB and the first detection signal DET1 may be signals activated to a logic low level. The first change detector 632 may generate the increase signal INC activated to a logic high level when both the preliminary increase signal INCB and the first detection signal DET1 are activated.

The second change detector 634 may be activated according to the first bit S_BL<0> of the first error location signal S_BL<0:15>, and activate a preliminary decrease signal (e.g., DECB of FIG. 17) when the respective bits of the first burst data DQ_BL0<2:7> and the second error location signal S_DQ<2:7> are both logic high bits. The second change detector 634 may activate a second detection signal DET2 by detecting a case where the number of logic high bits of the first burst data DQ_BL0<2:7> is equal to the reference value based on the first to sixth high-bit signals S1A, S2A, S3A, S1B, S2B, and S3B. The preliminary decrease signal DECB and the second detection signal DET2 may be signals activated to a logic low level. The second change detector 634 may generate the decrease signal DEC activated to a logic high level when both the preliminary decrease signal DECB and the second detection signal DEC2 are activated.

The mask signal generation circuit 650 may generate a first DM signal DM_BL0 based on a part of the first to sixth high-bit signals S1A, S2A, S3A, S1B, S2B, and S3B, and change a logic level of the DM signal DM_BL0 according to the increase signal INC and the decrease signal DEC. In FIG. 15, the reference numeral S5AB is a signal generated by performing a logic NAND operation on the third high-bit signal S3A and the fifth high-bit signal S2B, and will hereinafter be defined as a seventh high-bit signal S5AB. In addition, the reference numeral S5BB is a signal generated by performing a logic NAND operation on the second high-bit signal S2A and the sixth high-bit signal S3B, and will hereinafter be defined as an eighth high-bit signal S5BB. In FIG. 15, it is shown that the seventh and eighth high-bit signals S5AB and S5BB generated from the second change detector 634 are provided to the mask signal generation circuit 650, but the embodiments of the present disclosure are not limited thereto. According to embodiments, the mask signal generation circuit 650 may receive the first to sixth high-bit signals S1A, S2A, S3A, S1B, S2B, and S3B to generate seventh and eighth high-bit signals S5AB and S5BB.

Figure 16:
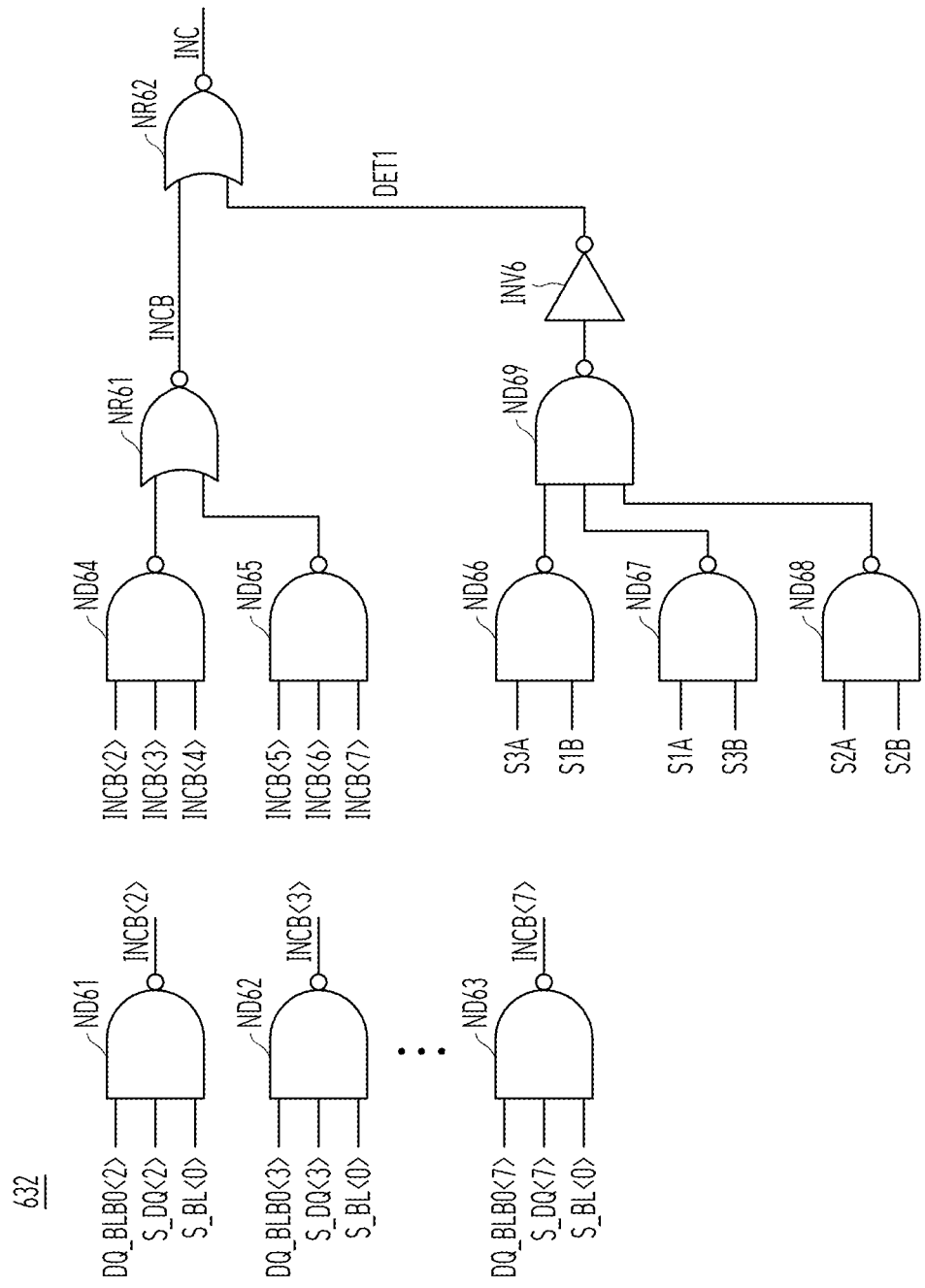
FIG. 16 is a circuit diagram illustrating a first change detector of FIG. 15.

FIG. 16 is a circuit diagram illustrating the first change detector 632 of FIG. 15.

Referring to FIG. 16, the first change detector 632 may include first to ninth NAND gates ND61 to ND69, first and second NOR gates NR61 and NR62, and an inverter INV6.

The first to third NAND gates ND61 to ND63 may generate increase detection bits INCB<2:7> by performing a logic NAND operation on respective bits of the inversion data DQ_BLB0<2:7>, respective bits of the second error location signal S_DQ<2:7>, and the first bit S_BL<0> of the first error location signal S_BL<0:15>. The fourth NAND gate ND64 may perform a logic NAND operation on the increase detection bits INCB<2:4>. The fifth NAND gate ND65 may perform a logic NAND operation on the increase detection bits INCB<5:7>. The NOR gate NR61 may generate the preliminary increase signal INCB by performing a logic NOR operation on outputs of the fourth and fifth NAND gates ND64 and ND65. As a result, the preliminary increase signal INCB may be activated to a logic low level when one of the increase detection bits INCB<2:7> becomes a logic low bit.

The sixth NAND gate ND66 may perform a logic NAND operation on the third high-bit signal S3A and the fourth high-bit signal S1B. The seventh NAND gate ND67 may perform a logic NAND operation on the first high-bit signal S1A and the sixth high-bit signal S3B. The eighth NAND gate ND68 may perform a logic NAND operation on the second high-bit signal S2A and the fifth high-bit signal S2B. The ninth NAND gate ND69 and the inverter INV6 may perform a logic AND operation on outputs of the sixth to eighth NAND gates ND66 to ND68 to output the first detection signal DET1. As a result, the first detection signal DET1 may be activated to a logic low level when the number of logic high bits of the first burst data DQ_BL0<2:7> is the boundary value.

The second NOR gate NR62 may output the increase signal INC by performing a logic NOR operation on the preliminary increase signal INCB and the first detection signal DET1.

With the above configuration, the first change detector 632 may be activated according to the first bit S_BL<0> of the first error location signal S_BL<0:15>, and output the increase signal INC activated to a logic high level when a logic high bit of the inverted data DQ_BLB0<2:7>, that is, a logic low bit of the first burst data DQ_BL0<2:7>, is detected as an error bit in a state that the number of logic high bits of the first burst data DQ_BL0<2:7> is equal to the boundary value.

Figure 17:
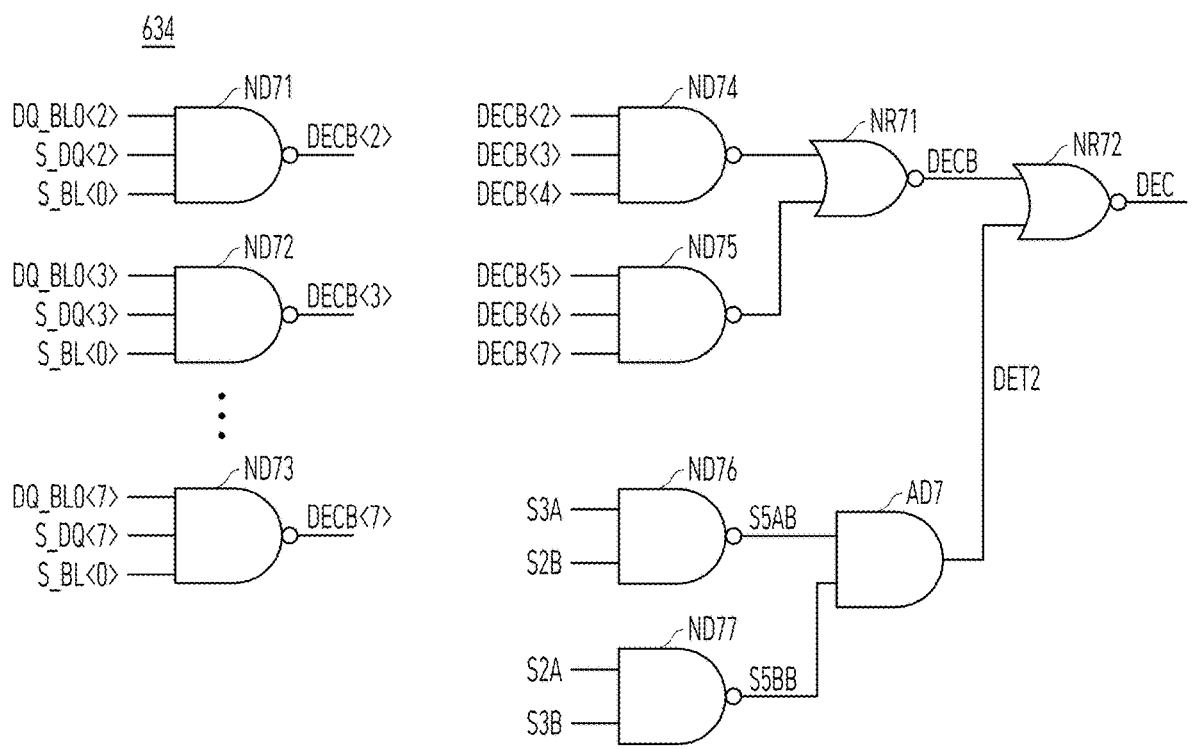
FIG. 17 is a circuit diagram illustrating a second change detector of FIG. 15.

FIG. 17 is a circuit diagram illustrating the second change detector 634 of FIG. 15.

Referring to FIG. 17, the second change detector 634 may include first to seventh NAND gates ND71 to ND77, an AND gate AD7, and first and second NOR gates NR71 and NR72.

The first to third NAND gates ND71 to ND73 may generate decrease detection bits DECB<2:7> by performing a logic NAND operation on respective bits of the first burst data DQ_BL0<2:7>, respective bits of the second error location signal S_DQ<2:7>, and the first bit S_BL<0> of the first error location signal S_BL<0:15>. The fourth NAND gate ND74 may perform a logic NAND operation on the decrease detection bits DECB<2:4>. The fifth NAND gate ND75 may perform a logic NAND operation on the decrease detection bits DECB<5:7>. The first NOR gate NR71 may generate the preliminary decrease signal DECB by performing a logic NOR operation on outputs of the fourth and fifth NAND gates ND74 and ND75. As a result, the preliminary decrease signal DECB may be activated to a logic low level when one of the decrease detection bits DECB<2:7> becomes a logic low bit.

The sixth NAND gate ND76 may output the seventh high-bit signal S5AB by performing a logic NAND operation on the third high-bit signal S3A and the fifth high-bit signal S2B. The seventh NAND gate ND77 may output the eighth high-bit signal S5BB by performing a logic NAND operation on the second high-bit signal S2A and the sixth high-bit signal S3B. The seventh and eighth high-bit signals S5AB and S5BB may be provided to the mask signal generation circuit 650 as signals activated to a logic low level when the number of logic high bits of the first burst data DQ_BL0<2:7> is equal to the reference value of 5. The AND gate AD7 may generate the second detection signal DET2 by performing a logic AND operation on outputs of the sixth and seventh NAND gates ND76 and ND77. As a result, the second detection signal DET2 may be activated to a logic low level when the number of logic high bits of the first burst data DQ_BL0<2:7> is equal to the reference value.

The second NOR gate NR72 may output the decrease signal DEC by performing a logic NOR operation on the preliminary decrease signal DECB and the second detection signal DET2.

With the above configuration, the second change detector 634 may be activated according to the first bit S_BL<0> of the first error location signal S_BL<0:15>, and output the decrease signal DEC activated to a logic high level when a logic high bit of the first burst data DQ_BL0<2:7> is detected as an error bit in a state that the number of logic high bits of the first burst data DQ_BL0<2:7> is equal to the reference value.

Figure 18:
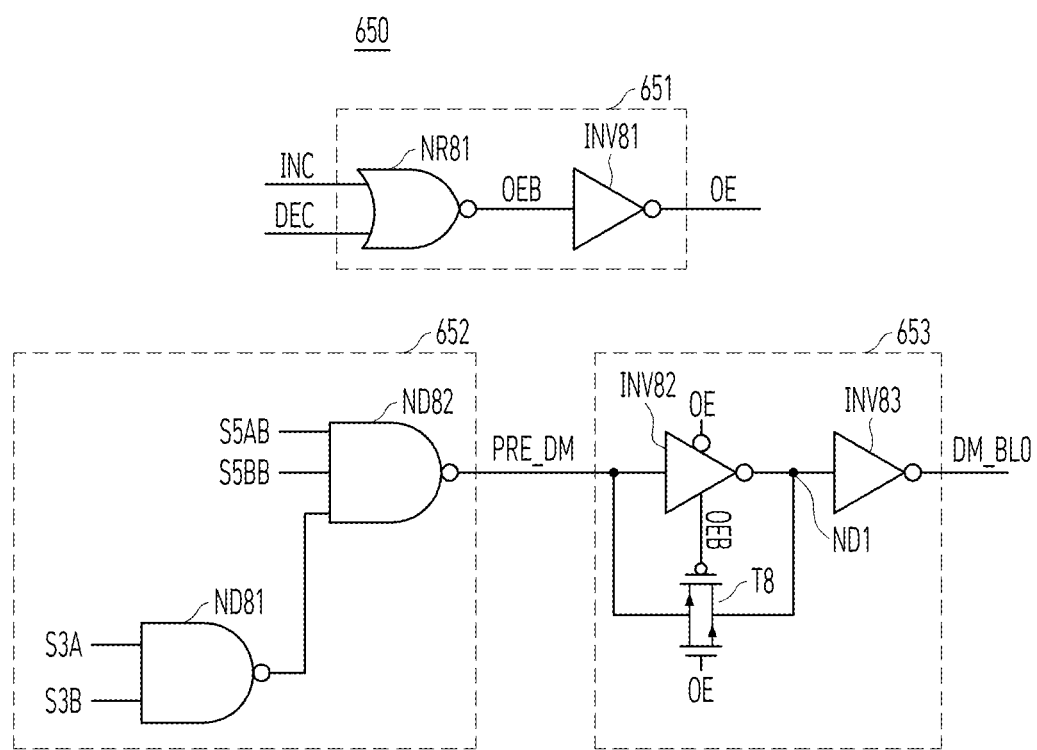
FIG. 18 is a circuit diagram illustrating a mask signal generation circuit of FIG. 15.

FIG. 18 is a circuit diagram illustrating the mask signal generation circuit 650 of FIG. 15.

Referring to FIG. 18, the mask signal generation circuit 650 may include an output control part 651, a signal generation part 652, and a signal output part 653.

The output control part 651 may generate a transfer control signal OE and an inverted transfer control signal OEB according to the increase signal INC or the decrease signal DEC. For example, the output control part 651 may include a first NOR gate NR81 and a first inverter INV81. The first NOR gate NR81 may output the inverted transfer control signal OEB by performing a logic NOR operation on the increase signal INC and the decrease signal DEC. The first inverter INV81 may output the transfer control signal OE by inverting the inverted transfer control signal OEB. With the above configuration, when the increase signal INC or the decrease signal DEC is activated, the output control part 651 may generate the transfer control signal OE of a logic high level and the inverted transfer control signal OEB of a logic low level.

The signal generation part 652 may generate a preliminary DM signal PRE_DM based on the high-bit signals S3A, S3B, S5AB, and S5BB. For example, the signal generation part 652 may include first and second NAND gates ND81 and ND82. The first NAND gate ND81 may perform a logic NAND operation on the third high-bit signal S3A and the sixth high-bit signal S3B. The second NAND gate ND82 may perform a logic NAND operation on the seventh high-bit signal S5AB, the eighth high-bit signal S5B and the output of the first NAND gate ND81 to output the preliminary DM signal PRE_DM. With the above configuration, the signal generation part 652 may activate the preliminary DM signal PRE_DM to a logic high level when the number of logic high bits of the first burst data DQ_BL0<2:7> is greater than or equal to the reference value.

The signal output part 653 may output the first DM signal DM_BL0 by selectively inverting the preliminary DM signal PRE_DM according to the transfer control signal OE and the inverted transfer control signal OEB. For example, the signal output part 653 may include second and third inverters INV82 and INV83 and a transmitter T8. The second inverter INV82 may be activated according to the inverted transfer control signal OEB, and invert and output the preliminary DM signal PRE_DM to a first node ND1. The transmitter T8 may be activated according to the transfer control signal OE, and may transmit the preliminary DM signal PRE_DM to the first node ND1 without inversion. The third inverter INV83 may output the first DM signal DM_BL0 by inverting a signal at the first node ND1. With the above configuration, the signal output part 653 may output the first DM signal DM_BL0 by inverting the preliminary DM signal PRE_DM when the transfer control signal OE becomes a logic high level, and output the preliminary DM signal PRE_DM as the first DM signal DM_BL0 when the inverted transfer control signal OEB becomes a logic high level.

Hereinafter, an operation of the first DM calculator 220_0 described with reference to FIGS. 15 to 18 will be described.

Figure 19A:
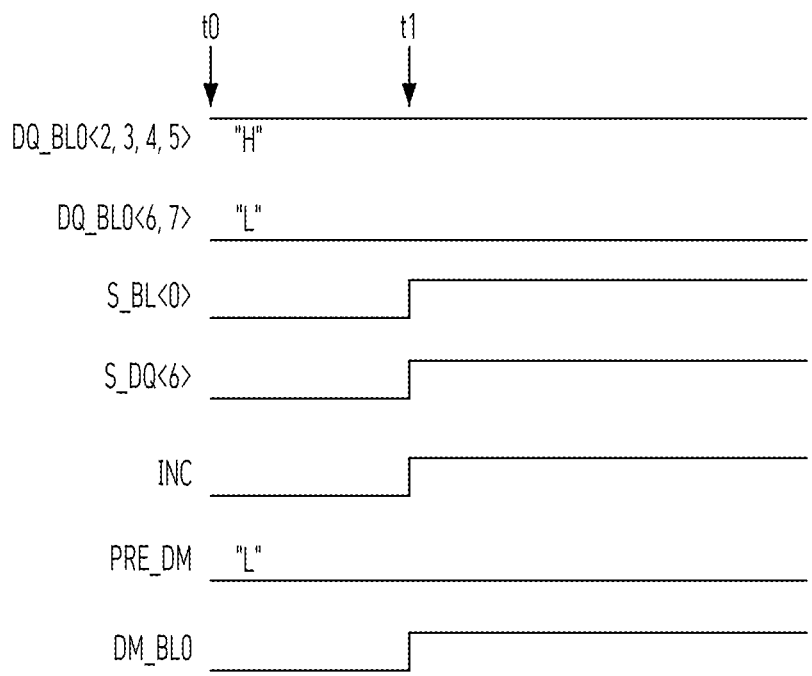
FIGS. 19A and 19B are waveform diagrams for describing an operation of the DM calculator of FIG. 15.
Figure 19B:
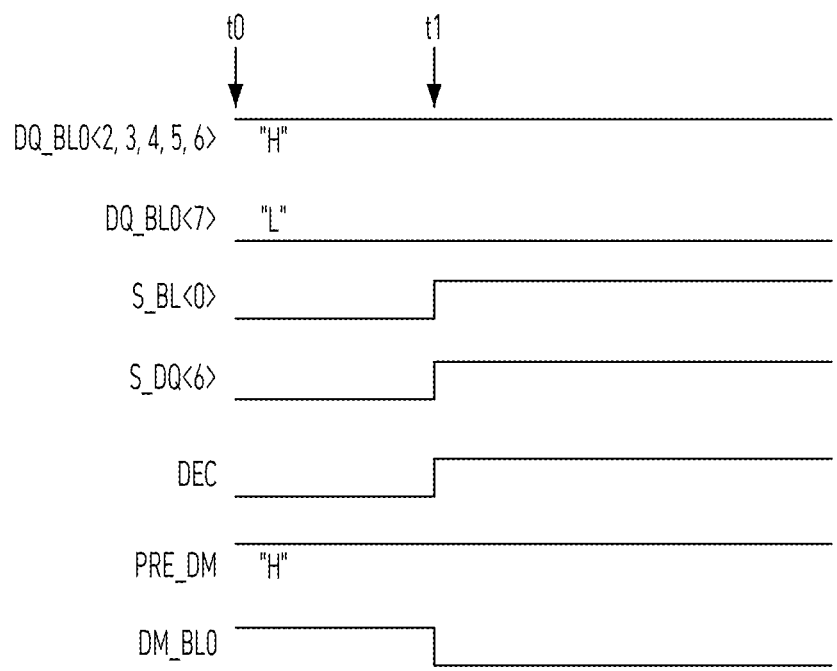

FIGS. 19A and 19B are waveform diagrams for describing an operation of the first DM calculator 220_0 of FIG. 15.

Referring to FIG. 19A, a case where some bits DQ_BL0<2,3,4,5> of the first burst data DQ_BL0<2:7> are logic high bits and the remaining bits DQ_BL0<6,7> are logic low bits is illustrated.

At the time point t0, the logic determination circuit 610 may detect logic high bits of the first burst data DQ_BL0<2:7> to activate the third high-bit signal S3A and the fourth high-bit signal S1B. Accordingly, the mask signal generation circuit 650 may deactivate the preliminary DM signal PRE_DM to a logic low level because the number of logic high bits of the first burst data DQ_BL0<2:7> is equal to a boundary value of 4 less than a reference value of 5. In this case, both the increase signal INC and the decrease signal DEC are deactivated, and thus the mask signal generation circuit 650 may output the preliminary DM signal PRE_DM as the first DM signal DM_BL0.

At a time point t1, the bit DQ_BL<6> of the first burst data DQ_BL0<0:7> is detected as an error bit. Thus, the first bit S_BL<0> of the first error location signal S_BL<0:15> and the bit S_DQ<6> of the second error location signal S_DQ<0:7> become logic high bits. In this case, since the bit DQ_BL<6> is a logic low bit in a state that the number of logic high bits of the first burst data DQ_BL0<2:7> is the boundary value of 4, the error change detection circuit 630 may output the increase detection bit INCB<6> to a logic low level thereby activating the increase signal INC to a logic high level. Accordingly, the mask signal generation circuit 650 may activate the first DM signal DM_BL0 to a logic high level by inverting the preliminary DM signal PRE_DM.

Referring to FIG. 19B, a case where some bits DQ_BL0<2,3,4,5,6> of the first burst data DQ_BL0<2:7> are logic high bits, and only the bit DQ_BL0<7> is a logic low bit it is illustrated.

At a time point t0, the logic determination circuit 610 may detect logic high bits of the first burst data DQ_BL0<2:7> to activate the third high-bit signal S3A and the fifth high-bit signal S2B. The mask signal generation circuit 650 may activate the preliminary DM signal PRE_DM to a logic high level because the number of logic high bits of the first burst data DQ_BL0<2:7> is equal to the reference value of 5. In this case, both the increase signal INC and the decrease signal DEC are deactivated, and the mask signal generation circuit 650 may output the preliminary DM signal PRE_DM as the first DM signal DM_BL0.

At the point of time t1, the bit DQ_BL<6> of the first burst data DQ_BL0<0:7> is detected as an error bit. Thus, the first bit S_BL<0> of the first error location signal S_BL<0:15> and the bit S_DQ<6> of the second error location signal S_DQ<0:7> become logic high bits. In this case, since the bit DQ_BL<6> of the first burst data DQ_BL0<0:7> is a logic high bit in a state that the number of logic high bits of the first burst data DQ_BL0<2:7> is the reference value of 5, the error change detection circuit 630 may activate the decrease signal DEC to a logic high level. Accordingly, the mask signal generation circuit 650 may deactivate the first DM signal DM_BL0 to a logic low level by inverting the preliminary DM signal PRE_DM.

As described above, in accordance with embodiments of the present disclosure, the memory device may minimize the write latency by performing, in parallel, the error correction operation and the DM calculation operation performed during the link ECC operation.

Various embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

It should be noted that although the technical spirit of the disclosure has been described in connection with embodiments thereof, this is merely for description purposes and should not be interpreted as limiting. It should be appreciated by one of ordinary skill in the art that various changes may be made thereto without departing from the technical spirit of the disclosure and the following claims.

For example, for the logic gates and transistors provided as examples in the above-described embodiments, different positions and types may be implemented depending on the polarity of the input signal.

What is claimed is:

1. A memory device comprising:
    a syndrome calculator circuit configured to generate an error location signal based on first data and an error correction code;
    an error corrector circuit configured to generate second data by correcting an error in the first data according to the error location signal; and
    a data mask (DM) calculation circuit configured to generate a DM signal according to logic high bits of the first data and change a logic level of the DM signal according to at least one of an increase signal and a decrease signal, by activating the increase signal when an error bit is detected in logic low bits of the first data and activating the decrease signal when the error bit is detected in the logic high bits of the first data, based on the error location signal.

2. The memory device of claim 1, wherein the DM calculation circuit
    activates the DM signal when a number of logic high bits of the first data is greater than or equal to a reference value, deactivates the DM signal when the decrease signal is activated in a state that the number of logic high bits is equal to the reference value, and activates the DM signal when the increase signal is activated in a state that the number of logic high bits is equal to a boundary value.

3. The memory device of claim 2, wherein the boundary value is set to a number less than the reference value.

4. The memory device of claim 1, further comprising:
    a data bus inversion (DBI) control circuit configured to generate third data by selectively inverting the second data according to a DBI signal; and
    a write circuit configured to write the third data in a memory core by masking the third data according to the DM signal.

5. The memory device of claim 4, further comprising:
a plurality of input and output circuits configured to receive and output the first data, the error correction code, and the DBI signal from and to an external device.

6. A memory device comprising:
a syndrome calculator circuit configured to generate first and second error location signals based on first data and an error correction code, the first data including m burst data input through data pads during m burst lengths, where m is a positive integer;
an error corrector circuit configured to generate second data by correcting an error in the first data according to the first and second error location signals; and
a plurality of data mask (DM) calculator circuits configured to generate DM signals corresponding to the m burst data, each DM calculator circuit configured to generate an increase signal and a decrease signal by detecting whether an error occurs in corresponding burst data according to the first and second error location signals, and generate a corresponding DM signal according to at least one of the increase signal and the decrease signal.

7. The memory device of claim 6,
wherein the first error location signal indicates a burst length during which an error bit of the first data is input among the m burst length, and
wherein the second error location signal indicates a data pad to which the error bit is input among the data pads.

8. The memory device of claim 6, wherein each DM calculator circuit
is activated according to the first error location signal, and
activates the increase signal when an error bit is detected in logic low bits of the corresponding burst data and activates the decrease signal when the error bit is detected in logic high bits of the corresponding burst data, according to the second error location signal.

9. The memory device of claim 6, wherein each DM calculator circuit
activates the corresponding DM signal when a number of logic high bits of the corresponding burst data is greater than or equal to a reference value, deactivates the corresponding DM signal when the decrease signal is activated in a state that the number of logic high bits is equal to the reference value, and activates the corresponding DM signal when the increase signal is activated in a state that the number of logic high bits is equal to a boundary value.

10. The memory device of claim 6, wherein the syndrome calculator circuit includes:
a code calculation circuit configured to generate a first preliminary error correction code using the first data; and
an error location detection circuit configured to compare the first preliminary error correction code with the error correction code for each bit to generate the first error location signal and the second error location signal, and
wherein the first error location signal indicates a burst length during which an error bit of the first data is input among the m burst length, and the second error location signal indicates a data pad to which the error bit is input among the data pads.

11. The memory device of claim 6, wherein each DM calculator circuit includes:
a logic determination circuit configured to generate high-bit signals representing the number of logic high bits of the corresponding burst data;
an error change detection circuit activated according to the first error location signal, configured to generate the increase signal or the decrease signal by detecting whether an error bit exists in the corresponding burst data according to the second error location signal; and
a mask signal generation circuit configured to generate the corresponding DM signal based on the high-bit signals and change a logic level of the corresponding DM signal according to at least one of the increase signal and the decrease signal.

12. The memory device of claim 11, wherein the logic determination circuit includes:
a first logic determinator configured to generate the high-bit signals indicating the number of logic high bits among lower bits of the corresponding burst data; and
a second logic determinator configured to generate the high-bit signals indicating the number of logic high bits among upper bits of the corresponding burst data.

13. The memory device of claim 11, wherein the error change detection circuit includes:
a first change detector activated according to the first error location signal, configured to activate the increase signal when respective bits of inversion data of the corresponding burst data and the second error location signal are both logic high bits; and
a second change detector activated according to the first error location signal, configured to activate the decrease signal when respective bits of the corresponding burst data and the second error location signal are both logic high bits.

14. The memory device of claim 11, wherein the mask signal generation circuit includes:
a first signal generator configured to generate a first preliminary signal when the increase signal is activated, by detecting a case in which the number of logic high bits of the corresponding burst data is equal to a boundary value based on the high-bit signals;
a second signal generator configured to generate a second preliminary signal by detecting a case in which the number of logic high bits is greater than or equal to a reference value based on the high-bit signals, and deactivate the second preliminary signal when the decrease signal is activated in a state that the number of logic high bits is equal to the reference value; and
a signal combiner configured to generate the corresponding DM signal according to the first preliminary signal and the second preliminary signal.

15. The memory device of claim 6, wherein each DM calculator circuit includes:
a logic determination circuit configured to generate high-bit signals representing the number of logic high bits of the corresponding burst data;
an error change detection circuit activated according to the first error location signal, configured to generate the increase signal or the decrease signal by detecting whether an error bit exists in the corresponding burst data according to the second error location signal when the number of logic high bits of the corresponding burst data is equal to a reference value or a boundary value based on the high-bit signals; and
a mask signal generation circuit configured to generate the corresponding DM signal based on the high-bit signals and change a logic level of the corresponding DM signal according to at least one of the increase signal and the decrease signal.

16. The memory device of claim 15, wherein the error change detection circuit includes:
a first change detector activated according to the first error location signal, configured to activate the increase signal when respective bits of inversion data of the corresponding burst data and the second error location signal are both logic high bits in a state that the number of logic high bits is equal to the boundary value; and
a second change detector activated according to the first error location signal, configured to activate the decrease signal when respective bits of the corresponding burst data and the second error location signal are both logic high bits in a state that the number of logic high bits is equal to the reference value.

17. The memory device of claim 15, wherein the mask signal generation circuit includes:
an output control part configured to activate a transfer control signal according to the increase signal or the decrease signal;
a signal generation part configured to generate a preliminary DM signal by detecting a case where the number of the logic high bits is greater than or equal to the reference value based on the high-bit signals; and
a signal output part configured to output the corresponding DM signal by selectively inverting the preliminary DM signal according to the transfer control signal.

18. An operating method of a memory device, the operating method comprising:
generating an error location signal based on first data and an error correction code;
generating second data by correcting an error in the first data according to the error location signal;
generating a data mask (DM) signal according to logic high bits of the first data and changing a logic level of the DM signal according to at least one of an increase signal and a decrease signal, by activating the increase signal when an error bit is detected in logic low bits of the first data and activating the decrease signal when the error bit is detected in the logic high bits of the first data, based on the error location signal; and
writing the second data to a memory core by selectively masking the second data according to the DM signal.

19. The operating method of claim 18, wherein the generating a data mask (DM) signal is simultaneously performed with the correcting the error in the first data.

20. The operating method of claim 18, wherein the changing a logic level of the DM signal includes:
activating the DM signal when a number of logic high bits of the first data is greater than or equal to a reference value; and
deactivating the DM signal when the decrease signal is activated in a state that the number of logic high bits is equal to the reference value, and activating the DM signal when the increase signal is activated in a state that the number of logic high bits is equal to a boundary value.

21. The operating method of claim 20, wherein the boundary value is set to a numberless than the reference value.

22. The operating method of claim 18, further comprising:
receiving the first data and the error correction code from an external device.

* * * * *